US011706043B2

United States Patent
Brevoort et al.

(10) Patent No.: US 11,706,043 B2
(45) Date of Patent: Jul. 18, 2023

(54) GROUP-BASED COMMUNICATION APPARATUS CONFIGURED TO IMPLEMENT OPERATIONAL SEQUENCE SETS AND RENDER WORKFLOW INTERFACE OBJECTS WITHIN A GROUP-BASED COMMUNICATION SYSTEM

(71) Applicant: Slack Technologies, LLC, San Francisco, CA (US)

(72) Inventors: Michael Brevoort, Littleton, CO (US); Angela Kirchhof, Denver, CO (US); Ratnadeep Bhattacharjee, Palo Alto, CA (US); Helen Kupp, Moraga, CA (US); Matthew Nolan Caudill, San Francisco, CA (US); Raquel Velez, San Francisco, CA (US); Leslie Newell, Aurora, CO (US)

(73) Assignee: Slack Technologies, LLC, San Francisco, CA (US)

( * ) Notice: Subject to any disclaimer, the term of this patent is extended or adjusted under 35 U.S.C. 154(b) by 9 days.

(21) Appl. No.: 17/409,263

(22) Filed: Aug. 23, 2021

(65) Prior Publication Data

US 2021/0385272 A1 Dec. 9, 2021

Related U.S. Application Data

(63) Continuation of application No. 17/391,795, filed on Aug. 2, 2021, now Pat. No. 11,558,453, which is a
(Continued)

(51) Int. Cl.
*H04L 12/18* (2006.01)
*H04L 67/104* (2022.01)
(Continued)

(52) U.S. Cl.
CPC ......... *H04L 12/1822* (2013.01); *G06N 3/042* (2023.01); *G06N 5/022* (2013.01);
(Continued)

(58) Field of Classification Search
CPC . H04L 67/1044; H04L 12/1822; H04L 51/04; H04L 51/216; H04L 65/1083;
(Continued)

(56) References Cited

U.S. PATENT DOCUMENTS

2011/0040604 A1* 2/2011 Kaib ................... G06Q 30/02
705/347
2014/0129942 A1* 5/2014 Rathod ............ H04N 21/44226
715/720
(Continued)

OTHER PUBLICATIONS

"Die, Email, Die! A Flickr Cofounder Aims to Cut Us All Some Slack", READWRITEWEB, LEXISNEXIS, https://advance.lexis.com/api/permalink/33dd79e2-90f5-409d-ae27-5a2c7e86bf31/?context=1000516>. (dated Aug. 14, 2013, 4:15 PM) 2 pages.
(Continued)

*Primary Examiner* — Austin J Moreau
*Assistant Examiner* — Chhian (Amy) Ling
(74) *Attorney, Agent, or Firm* — Erise IP, P.A.

(57) ABSTRACT

Various embodiments of the present invention are directed to an improved group-based communication apparatus that is configured to render one or more workflow interface objects to a group-based communication apparatus in association with an operational sequence set returned by a query. The group-based communication apparatus is configured to detect a workflow trigger event associated with a workflow identifier, retrieve an operational sequence set based upon at least the workflow identifier from a group-based communication workflow repository, initiate the operational sequence set, and cause rendering of one or more workflow interface objects to the group-based communication interface. In
(Continued)

some embodiments, the operational sequence sets are associated with a group-defined template.

17 Claims, 9 Drawing Sheets

Related U.S. Application Data continuation of application No. 16/779,101, filed on Jan. 31, 2020, now Pat. No. 11,082,486.

(51) Int. Cl.
| | |
|---|---|
| H04L 51/04 | (2022.01) |
| G06N 20/00 | (2019.01) |
| H04L 51/216 | (2022.01) |
| H04L 65/1083 | (2022.01) |
| G06N 5/022 | (2023.01) |
| G06N 3/042 | (2023.01) |

(52) U.S. Cl.
CPC ............. *G06N 20/00* (2019.01); *H04L 51/04* (2013.01); *H04L 51/216* (2022.05); *H04L 65/1083* (2013.01); *H04L 67/1044* (2013.01)

(58) Field of Classification Search
CPC .... H04L 67/104; G06N 3/0427; G06N 5/022; G06N 20/00; G06N 3/042
See application file for complete search history.

(56) References Cited

U.S. PATENT DOCUMENTS

| | | | | |
|---|---|---|---|---|
| 2014/0324982 | A1* | 10/2014 | Agrawal | H04L 51/216 |
| | | | | 709/206 |
| 2015/0106834 | A1* | 4/2015 | Keomany | H04N 21/4181 |
| | | | | 725/25 |
| 2015/0350258 | A1* | 12/2015 | Griffin | H04N 7/15 |
| | | | | 348/14.08 |
| 2017/0286429 | A1* | 10/2017 | Lange | G06F 16/48 |
| 2017/0373868 | A1* | 12/2017 | Deets, Jr. | H04L 65/4015 |
| 2018/0287982 | A1 | 10/2018 | Draeger et al. | |
| 2019/0028419 | A1* | 1/2019 | Sullivan | H04M 1/72436 |
| 2019/0386842 | A1* | 12/2019 | Silva | H04L 51/046 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
Adrienne LaFrance, "The Triumph of Email", Atlantic Online, LEXISNEXIS, https://advance.lexis.com/api/permalink/32d7ddd9-d4c1-4a73-86f7-08ab5842fde6/?context=1000516, (dated Jan. 6, 2016) 5 pages.
David Auerbach, "Re-Animator. How Stewart Butterfield created Flickr and Slack out of the ashes of failed projects" [online][retrieved May 9, 2019]. Retrieved from the Internet: <URL https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 13 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", GIGAOM, LEXISNEXIS, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications—", FUJITSU Sci. Tech J., 36, 2, (Dec. 2000) 154-161.
Matthew Ingram, "Flickr co-founder launches Slack, an all-in-one messaging tool designed to kill email forever", GIGAOM, LEXISNEXIS, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", PANDODAILY, LEXISNEXIS, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (BITS), LEXISNEXIS, https://advance.lexis.com/api/permalink/3eb84b34-a8f9-4d7d-9573-89d9598a4963/?> (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, At FP10, LEXISNEXIS, https://advancelexis.com/api/permalink/96268e3f-26ad-48ac-a98f-6c39804ebded/?context=1000516, (dated Mar. 4, 2014) 2 pages.
Robert Hof, "Stewart Butterfield On How Slack Became A $2.8 Billion Unicom", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

GROUP-BASED COMMUNICATION APPARATUS CONFIGURED TO IMPLEMENT OPERATIONAL SEQUENCE SETS AND RENDER WORKFLOW INTERFACE OBJECTS WITHIN A GROUP-BASED COMMUNICATION SYSTEM

RELATED APPLICATIONS

This application is a continuation application and claims priority benefit, with regard to all common subject matter, of earlier-filed U.S. patent application Ser. No. 17/391,795, filed Aug. 2, 2021, now U.S. Pat. No. 11,558,453, issued Jan. 17, 2023 ("the '453 Patent"). The '453 Patent is a continuation and claims priority benefit, with regard to all common subject matter, of earlier-filed U.S. patent application Ser. No. 16/779,101, filed Jan. 31, 2020, now U.S. Pat. No. 11,082,486, issued Aug. 3, 2021 ("the '486 Patent"). The identified earlier-filed patent and patent application are hereby incorporated by reference in their entirety into the present application.

BACKGROUND

Various communication systems facilitate messaging communications and collaboration among a plurality of users across client devices connected with a centralized communication system. Applicant has identified a number of deficiencies and problems associated with such conventional communication systems. Through applied effort, ingenuity, and innovation, these deficiencies and problems have been solved by developing solutions that are structured in accordance with the embodiments of the present invention, many examples of which are described in detail herein.

BRIEF SUMMARY

Various embodiments provided herein disclose improved apparatuses, methods, and computer program products for implementing operational sequence sets and rendering workflow interface objects within a group-based communication system.

One embodiment is directed to a group-based communication apparatus configured to render one or more workflow interface objects in a group-based communication interface of a group-based communication system, the group-based communication apparatus comprising at least one processor and at least one memory, the at least one memory having computer-coded instructions therein, wherein the computer-coded instructions are configured to, in execution with the at least one processor, cause the group-based communication apparatus to detect a workflow trigger event, the workflow trigger event associated with a workflow identifier; retrieve an operational sequence set based upon at least the workflow identifier from a group-based communication workflow repository, the operational sequence set associated with a group-defined template; initiate the operational sequence set; and cause rendering of one or more workflow interface objects to the group-based communication interface based upon the operational sequence set and the group-defined template.

In certain embodiments, detecting a workflow trigger event is associated with receiving a channel creation request from a client device and the operational sequence set comprises operational sequence steps that are sufficient to programmatically generate a group-based communication channel. In some embodiments, the operational sequence steps comprise configuring at least one of a channel title object, a channel interface arrangement, a channel folder structure, a channel member suggestion set, a channel-specific external applications configuration, a channel-specific message formatting configuration, or combinations thereof.

In certain embodiments, programmatically generating a group-based communication channel comprises configuring a channel member suggestion set, the channel member suggestion set comprising one or more user recipients to be sent a channel invitation request to become a member of the group-based communication channel; programmatically generating a channel invitation request for each of the one or more user recipients; and transmitting the channel invitation requests to each of the one or more user recipients.

In some embodiments, the operational sequence steps further comprise programmatically generating and transmitting at least one workflow event to one or more additional group-based communication channels. In certain embodiments, the operational sequence steps further comprise programmatically generating and transmitting at least one workflow event to one or more external applications.

In some embodiments, the group-defined template is programmatically determined based on relationships identified among group-based communication objects of a group-based communication workflow data corpus. In still further embodiments, the relationships are programmatically determined based on one or more trained machine learning models. In certain embodiments, the group-defined template comprises a group-defined channel configuration template.

Some embodiments are directed to group-based communication apparatus configured to render a workflow menu interface in a group-based communication interface of a group-based communication system, the group-based communication apparatus comprising at least one processor and at least one memory, the at least one memory having computer-coded instructions therein, wherein the computer-coded instructions are configured to, in execution with the at least one processor, cause the group-based communication apparatus to receive an operational sequence set query associated with a channel identifier; query a group-based communication workflow repository for channel supported operational sequence sets associated with the channel identifier; and cause rendering of a workflow menu interface to the group-based communication interface of a client device associated with the operational sequence set query, the workflow menu interface comprising channel supported workflow interface objects, and wherein each of the channel supported workflow interface objects is associated with one of the channel supported operational sequence sets. In certain embodiments, each of the channel supported workflow interface objects is configured for user engagement via the group-based communication interface.

In some embodiments, the computer-coded instructions are further configured to cause the group-based communication apparatus to detect user engagement of a selected channel supported workflow interface object via the group-based communication interface; and initiate a selected channel supported operational sequence set associated with the selected channel supported workflow interface object, wherein the selected channel supported operational sequence set comprises operational sequence steps.

In certain embodiments, at least one of the operational sequence steps comprises programmatically generating and transmitting at least one workflow event to one or more external applications. In some embodiments, the computer-coded instructions are further configured to cause the group-based communication apparatus to receive workflow data associated with the at least one workflow event from the one or more external applications; and store the received workflow data to a group-based communication workflow data corpus.

In certain embodiments, the operational sequence steps comprise causing one or more workflow interface objects to be rendered within the group-based communication interface of the client device. In some embodiments, the one or more workflow interface objects are configured to embody an interactive dialog interface for user engagement via the group-based communication interface.

In some embodiments, the computer-coded instructions are further configured to cause the group-based communication apparatus to store workflow data input associated with user engagement of the interactive dialog interface to a group-based communication workflow data corpus. In certain embodiments, the selected channel supported operational sequence set comprises at least one workflow milestone event and the interactive dialog interface is associated with the at least one workflow milestone event. In still further embodiments, the operational sequence set query is further associated with a group identifier and wherein the computer-coded instructions are further configured to cause the group-based communication apparatus to in response to detecting completion of a first workflow milestone event, programmatically generating and transmitting at least one workflow event to one or more client devices associated with the group identifier. In some embodiments, the operational sequence steps further comprise causing one or more workflow interface objects to be rendered to the one or more client devices associated with the group identifier and wherein the computer-coded instructions are further configured to cause the group-based communication apparatus to receive workflow data associated with the workflow interface objects from the one or more client devices associated with the group identifier; and store the received workflow data to a group-based communication workflow data corpus.

In some embodiments, each of the channel supported operational sequence sets is associated with a group-defined template, the group-defined template programmatically determined based on relationships identified among group-based communication objects of a group-based communication workflow data corpus. In still further embodiments, the relationships are programmatically determined based on one or more trained machine learning models.

Some embodiments are directed to computer-implemented method for rendering workflow menu interface in a group-based communication interface of a group-based communication system, the computer-implemented method comprising receiving an operational sequence set query associated with a channel identifier; querying a group-based communication workflow repository for channel supported operational sequence sets associated with the channel identifier; and rendering a workflow menu interface to the group-based communication interface of a client device associated with the operational sequence set query, the workflow menu interface comprising channel supported workflow interface objects, and wherein each of the channel supported workflow interface objects is associated with one of the channel supported operational sequence sets Some embodiments further comprise detecting user engagement of a selected channel supported workflow interface and initiating a selected channel supported operational sequence set associated with the selected channel supported workflow interface object, wherein the selected channel supported operational sequence set comprises operational sequence steps.

Some embodiments further comprise programmatically generating and transmitting at least one workflow event to one or more external applications. Certain embodiments further comprise receiving workflow data associated with the at least one workflow event from the one or more external applications and storing the received workflow data to a group-based communication workflow data corpus.

Some embodiments are directed to a computer-implemented method for rendering one or more workflow interface object in a group-based communication interface of a group-based communication system, the computer-implemented method comprising detecting a workflow trigger event, the workflow trigger event associated with a workflow identifier; retrieving an operational sequence set based upon at least the workflow identifier from a group-based communication workflow repository, the operational sequence set associated with a group-defined template; initiating the operational sequence set; and rendering one or more workflow interface objects to the group-based communication interface based upon the operational sequence set and the group-defined template.

In certain embodiments, detecting a workflow trigger event comprises receiving a channel creation request from a client device and the operational sequence set comprises operational sequence steps that are sufficient to programmatically generate a group-based communication channel. Some embodiments further comprise programmatically generating a group-based communication channel.

In some embodiments, the operational sequence steps comprise configuring at least one of a channel title object, a channel interface arrangement, a channel folder structure, a channel member suggestion set, a channel-specific external applications configuration, a channel-specific message formatting configuration, or combinations thereof.

Some embodiments further comprise configuring at least one of a channel title object, a channel interface arrangement, a channel folder structure, a channel member suggestion set, a channel-specific external applications configuration, a channel-specific message formatting configuration, or combinations thereof.

In certain embodiments, programmatically generating a group-based communication channel comprises configuring a channel member suggestion set, the channel member suggestion set comprising one or more user recipients to be sent a channel invitation request to become a member of the group-based communication channel; programmatically generating a channel invitation request for each of the one or more user recipients; and transmitting the channel invitation requests to each of the one or more user recipients.

In some embodiments, the operational sequence steps further comprise programmatically generating and transmitting at least one workflow event to one or more additional group-based communication channels. In certain embodiments, the operational sequence steps further comprise programmatically generating and transmitting at least one workflow event to one or more external applications.

Some embodiments are directed to a computer program product comprising a non-transitory computer readable medium having computer program instructions stored therein, the computer program instructions configured to, when executed by a processor, cause the processor to detect a workflow trigger event, the workflow trigger event associated with a workflow identifier; retrieve an operational sequence set based upon at least the workflow identifier from a group-based communication workflow repository, the operational sequence set associated with a group-defined template; initiate the operational sequence set; and cause rendering of one or more workflow interface objects to a group-based communication interface based upon the operational sequence set and the group-defined template.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

Figure 1:
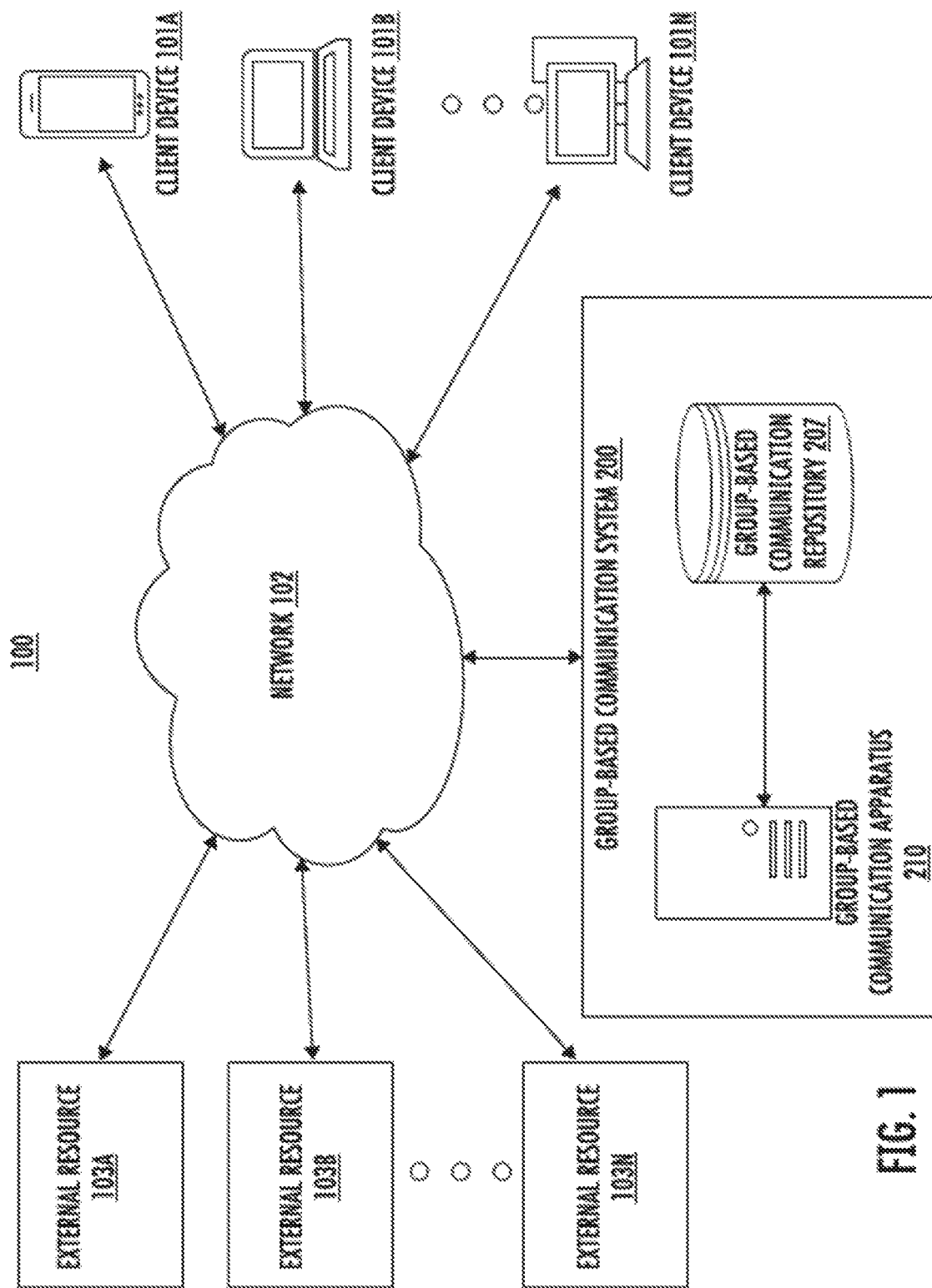
Figure 2:
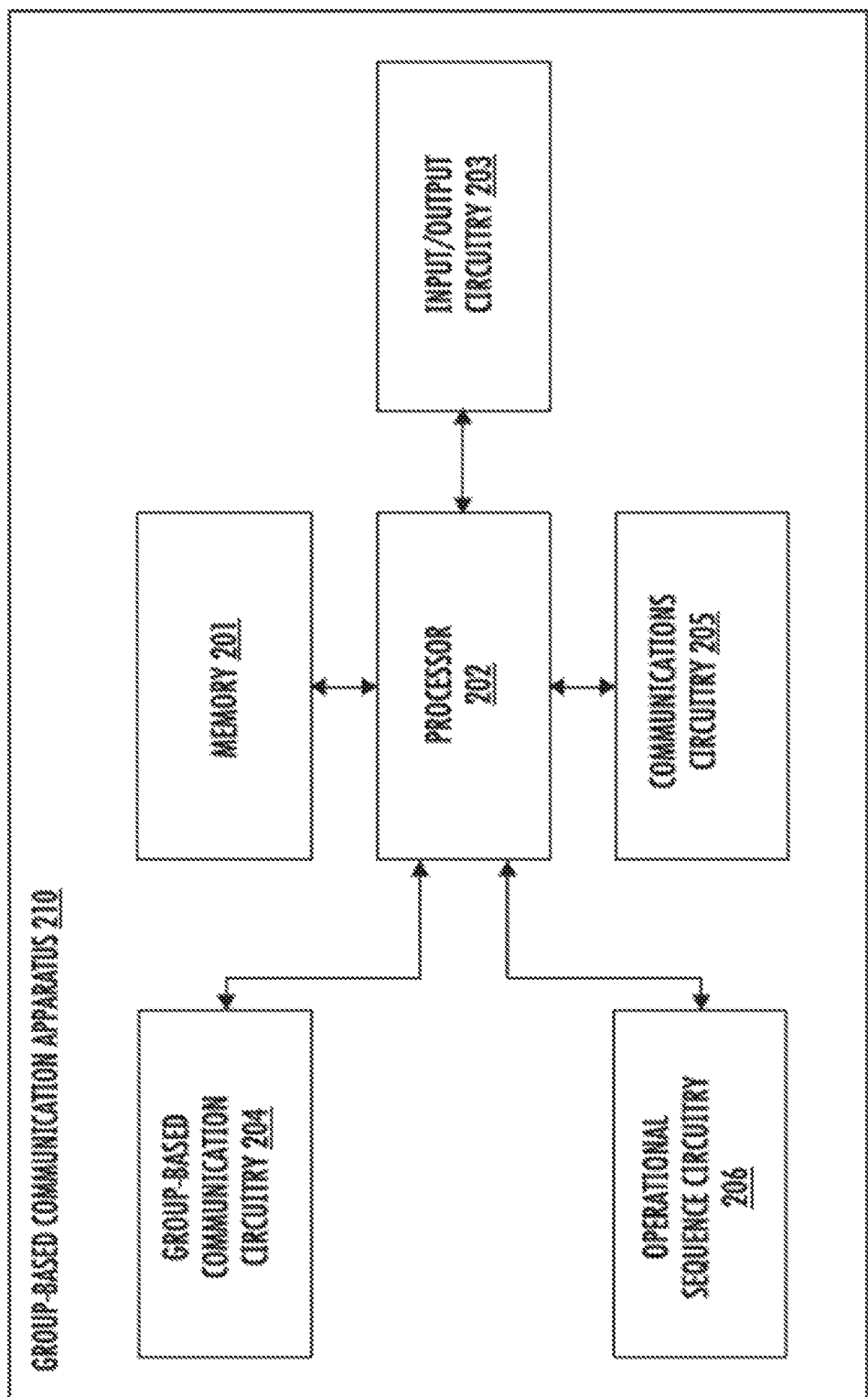
Figure 3A:
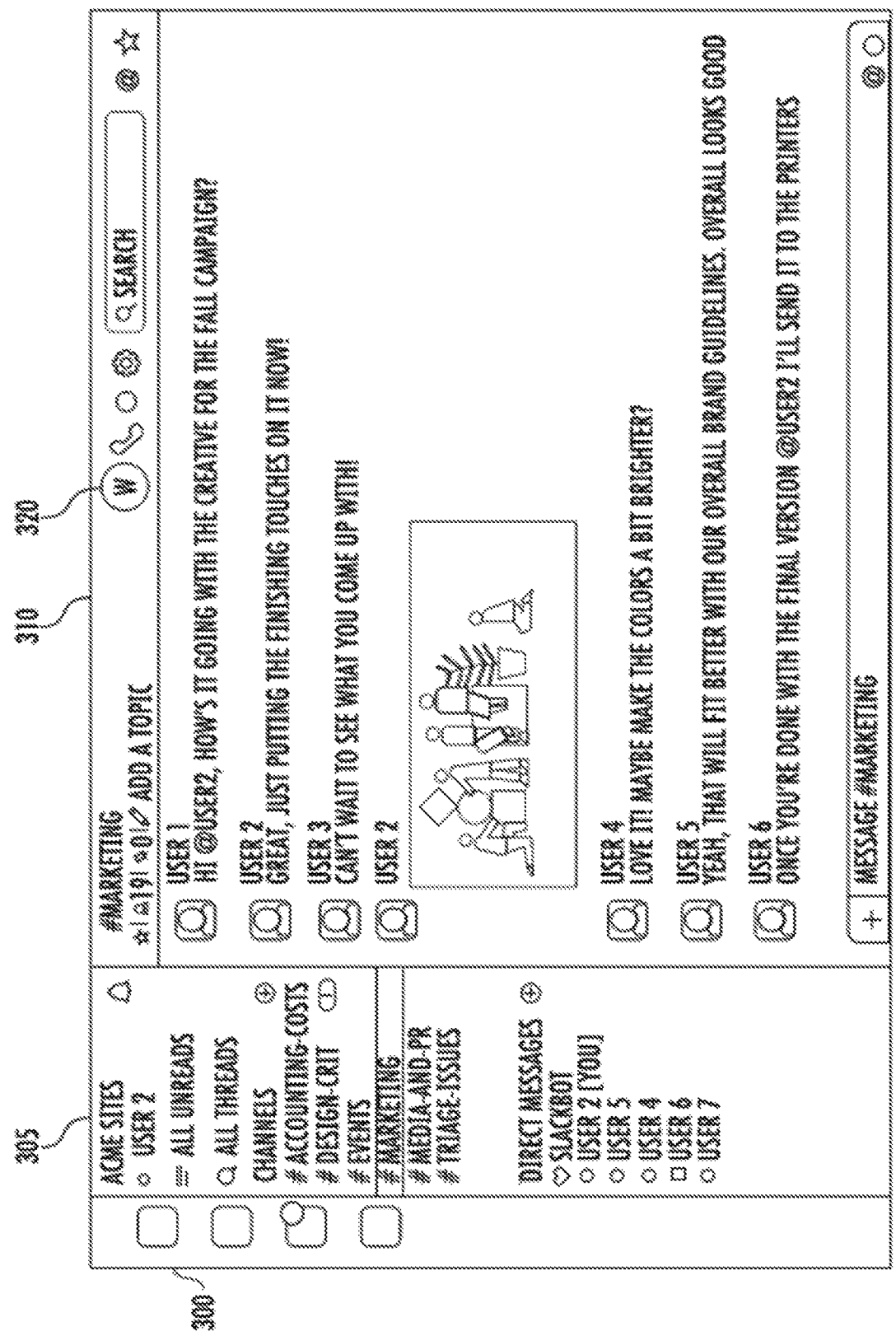
Figure 3B:
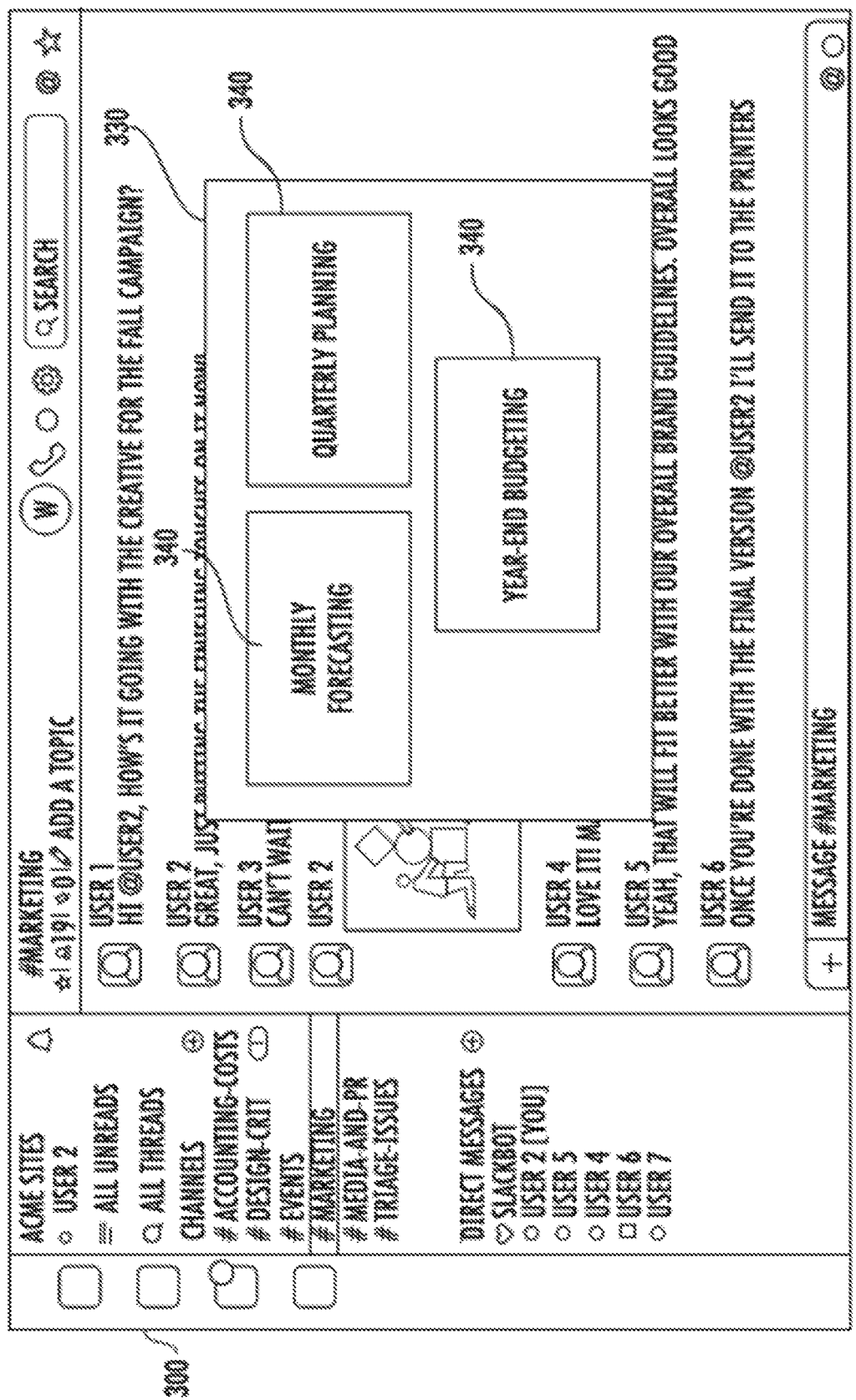
Figure 4:
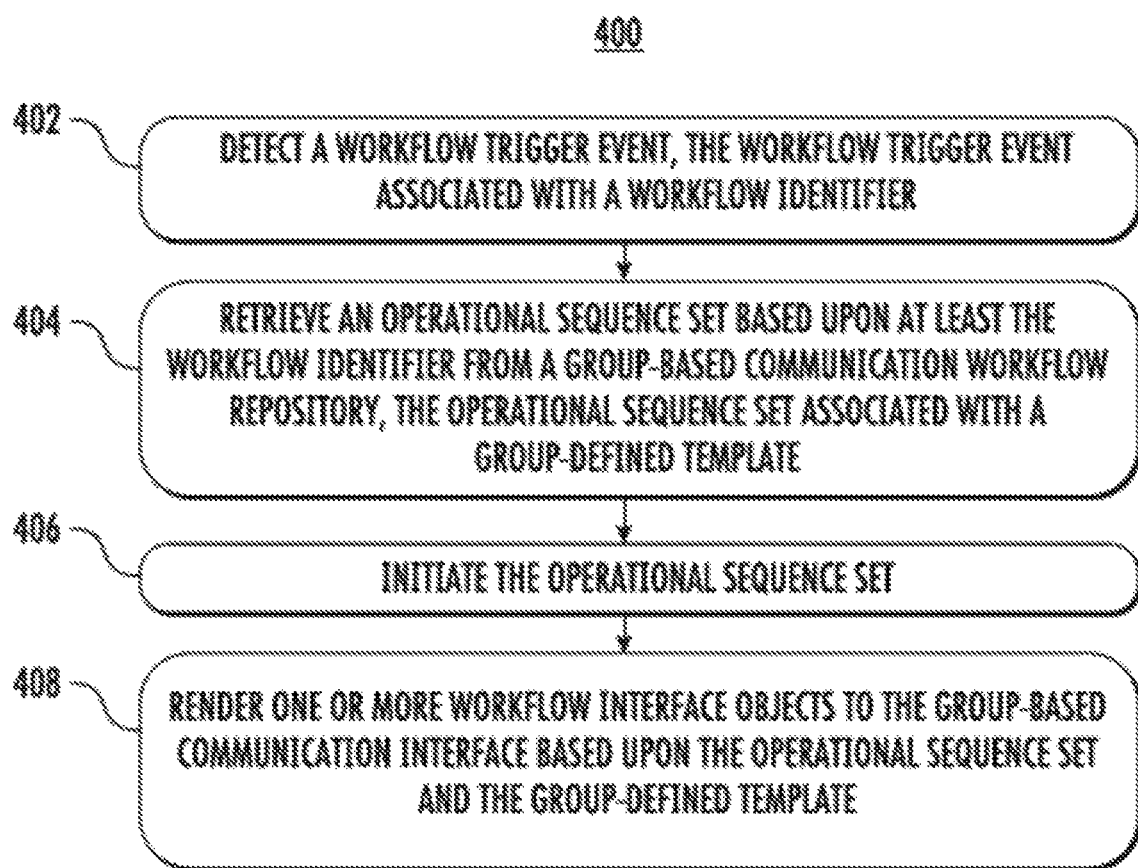
Figure 5A:
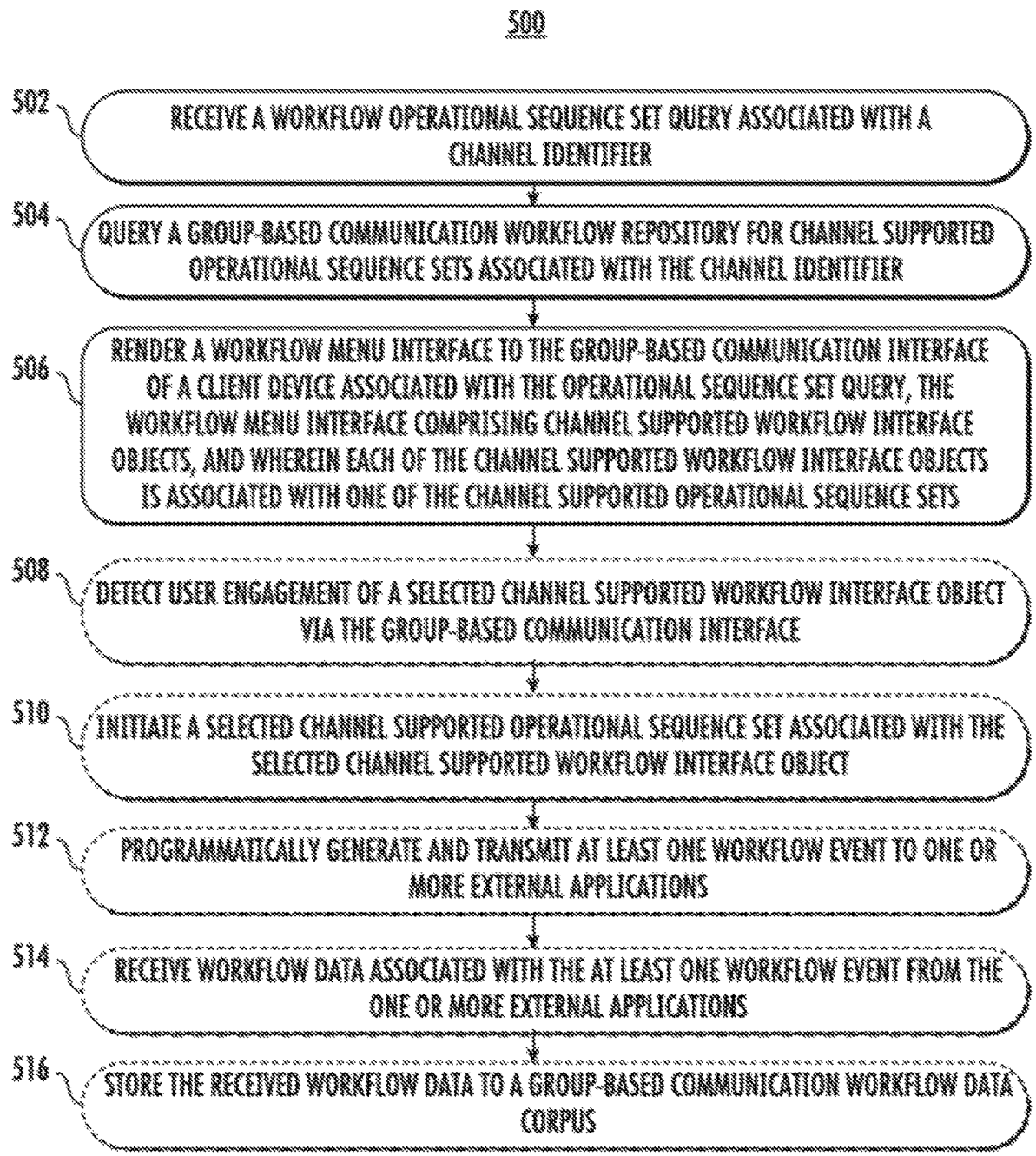
Figure 5B:
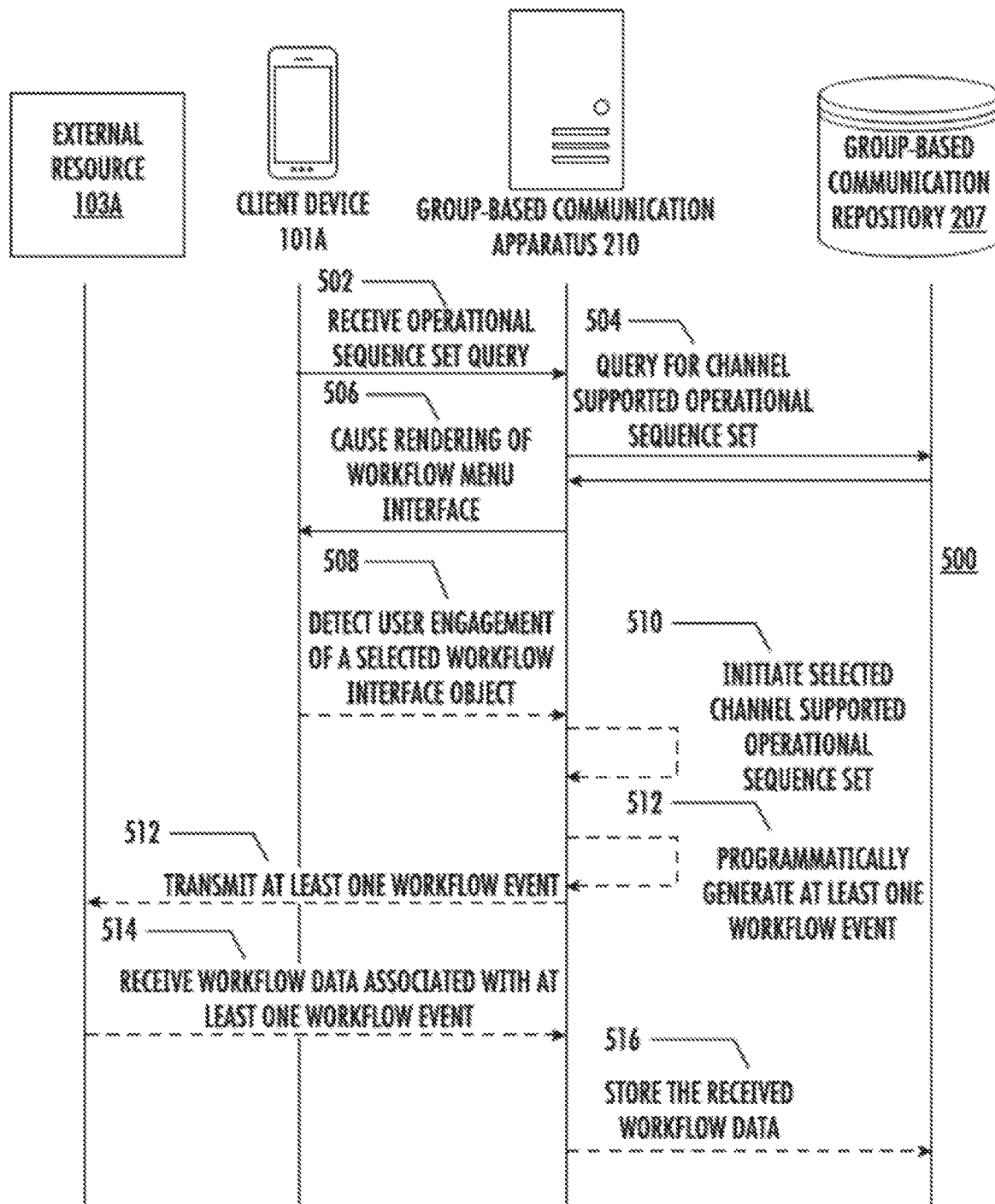
Figure 6A:
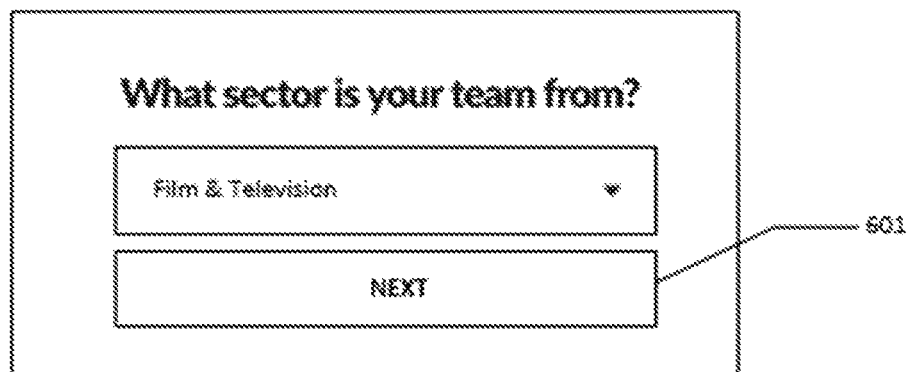
Figure 6B:
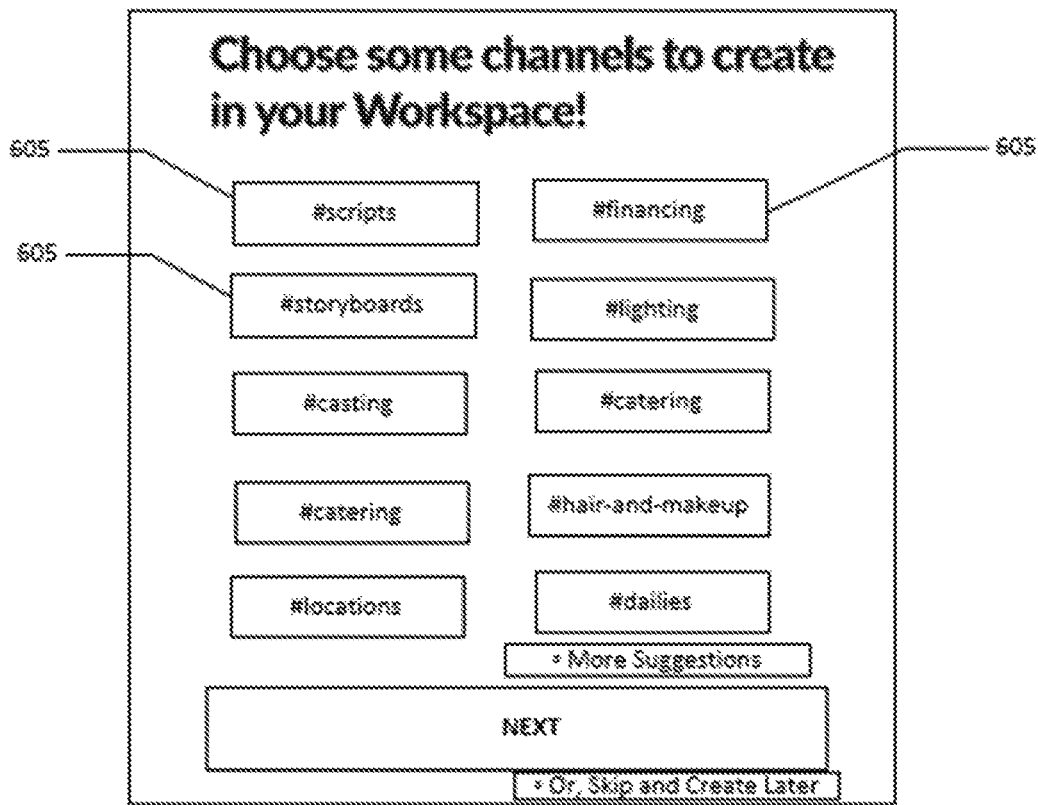
Figure 6C:
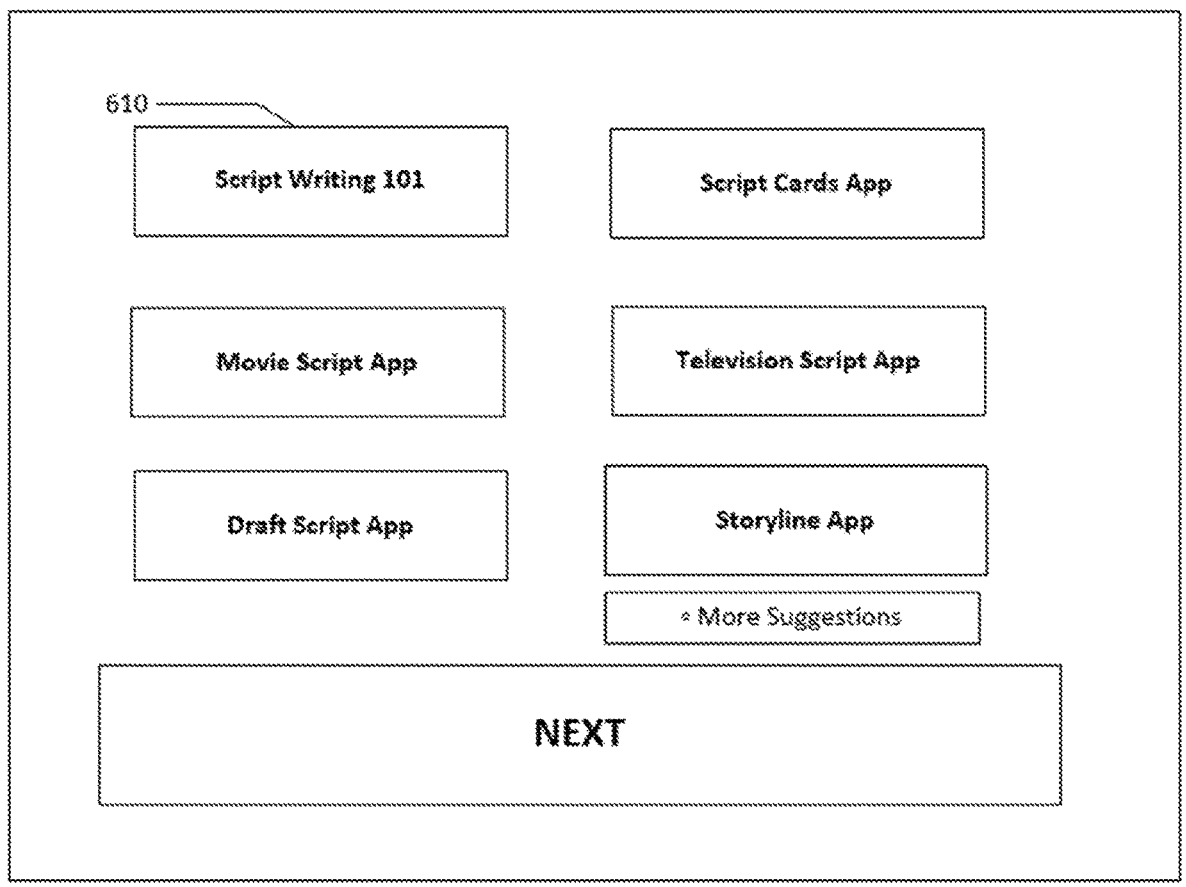

Having thus described some embodiments in general terms, reference will now be made to the accompanying drawings, which are not necessarily drawn to scale, and wherein:

FIG. 1 illustrates a schematic view of a group-based communication system in communication with client devices and external resources according to various embodiments of the present invention;

FIG. 2 shows a schematic view of a group-based communication apparatus according to one embodiment;

FIG. 3A depicts an example group-based communication interface structured in accordance with various embodiments of the present disclosure;

FIG. 3B depicts an example group-based communication interface structured in accordance with various embodiments of the present disclosure;

FIG. 4 is a flowchart illustrating example operations for rendering one or more workflow interface objects in a group-based communication system in accordance with one embodiment of the present disclosure;

FIG. 5A is a flowchart illustrating example operations for rendering a workflow menu interface and initiating a channel support operational sequence set in a group-based communication system in accordance with one embodiment of the present disclosure;

FIG. 5B illustrates an example signal diagram illustrating data flow interactions between a group-based communication apparatus, a group-based communication repository, an external resource, and a client device when rendering a workflow menu interface and initiating a channel support operational sequence set in accordance with one embodiment of the present disclosure;

FIG. 6A depicts an example group-based communication interface structured in accordance with various embodiments of the present disclosure;

FIG. 6B depicts an example group-based communication interface with workflow interface objects structured in accordance with various embodiments of the present disclosure; and FIG. 6C depicts an example group-based communication interface with channel configurations associated with external applications structured in accordance with various embodiments of the present disclosure.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

In a group-based communication system, users may communicate and collaborate with one another on a variety of projects, goals, topics, etc. Some of the steps, tasks, or functions associated with such projects may be repetitive and/or similar across multiple projects within a channel, group, or organization. For example, each time a sales team signs a project with a new customer, a particular series of actions may need to occur, such as staffing the project, creating one or more channels to handle different aspects of the project (e.g., contract review, change orders, design, etc.), providing certain deliverables, configuring access to one or more external resources or applications to develop the project, as well as coordinate efficient and informed decisions and approvals by management or other individuals throughout the entirety of the project. Even upon completion of the project, the closing and archival of the project is often required. Thus, it is desirable for the group-based communication system to support the organization and efficient configuration of such functions required by multiple users, multiple group-based communication channels, and multiple external applications.

In addition, configuring the various parameters, settings, and variables required when creating a new a group-based communication channel often can be complicated and nonintuitive for new users and experienced users alike. Indeed, regardless of whether a user is new to a group-based communication system or not, channel configurations such as determining a channel folder structure, identifying potential members, and configuring access to external applications can be frustrating and time consuming to any user without guidance. This problem is exacerbated as the number of users and channels increase for any particular group-based communication workspace. In addition, when channels are not configured correctly, indexing and retrieval of data objects or search results from such channels suffer delays when performed by the system. Thus, it is desirable for the group-based communication system to support multiple users and multiple group-based communication channels while allowing users to easily create group-based communication channels and increasing efficiency of indexing and search capabilities.

Applicant has identified that providing access to a variety of channel supported workflow interface objects associated with channel supported operational sequence sets that structure the configuration of recurring project or task functions improves user experience and reduces burden on the system. Additionally, Applicant has identified that providing access to operational sequence sets associated with group-defined templates via one or more workflow interface objects streamlines a variety of the configurations required of a user. For example, the channel configuration needs may often be similar or common across multiple members of a group, thus, group-defined templates comprising a group-defined channel configuration template allows the group-based communication system to minimize the complexity and time required in creating a new group-based communication channel, thereby easing the channel creation process and also educating users how to use channels. Using a group-defined template also increases efficiency of indexing and search capabilities by the group-based communication system.

Various embodiments of the present disclosure are directed to improved group-based communication apparatuses, methods, and computer program products for implementing operational sequence sets and rendering workflow interface objects within a group-based communication system. In one example, the group-based communication apparatus detects a workflow trigger event, wherein the workflow trigger event is associated with a workflow identifier. The group-based communication apparatus retrieves an operational sequence set based upon at least the workflow identifier from a group-based communication workflow repository, the operational sequence set associated with a group-defined template. The group-based communication apparatus initiates the operational sequence set and causes rendering of one or more workflow interface objects to the group-based communication interface based upon the operational sequence set and the group-defined template. Exemplary embodiments herein enable a user to create a new group-based communication channel in a fast and efficient manner without having to invoke conventional processes that may require a more extensive series of inputs (e.g., clicks or selections) from the user.

In another example, the group-based communication apparatus receives an operational sequence set query associated with a channel identifier, queries a group-based communication workflow repository for channel supported operational sequence sets associated with the channel identifier, and causes rendering of a workflow menu interface to the group-based communication interface of a client device associated with the operational sequence set query, the workflow menu interface comprising channel supported workflow interface objects, and wherein each of the channel supported workflow interface objects is associated with one of the channel supported operational sequence sets.

In another example, the group-based communication apparatus is configured to transmit workflow events and store workflow data input associated with user engagement with the group-based communication system in a group-based communication workflow data corpus. A work graph data structure can be assembled from such group-based communication workflow data corpus and can be used to illustrate relationships between various users, group-based communication channels, workflow data inputs, workflow events, and other group-based communication objects. Such a work graph data structure may be leveraged via machine-learning and/or artificial-intelligence configurations and/or models to present users with group-defined templates that can be used to provide a plurality of expansive, relevant operational sequence sets and/or the like.

Definitions

Certain terms used in connection with exemplary embodiments are defined below.

The term "group-based" is used herein to refer to a system, channel, communication, message, or virtual environment that has security sufficient such that the system, channel, communication, message, or virtual environment is accessible only to a defined group of users (e.g., users having a common group identifier associated with their respective user profiles). In some embodiments, the group is defined by common access credentials, such as those of an organization or commercial enterprise. In still further embodiments, access is further facilitated by a validated request to join or an invitation to join transmitted by one group member user to another non-member user. Group identifiers (defined below) are used to associate data, information, messages, users, group-based communication channels, etc., with specific groups of a group-based communication system as defined below.

The term "group-based communication system" refers to the communications software platform and associated hardware that is configured to support and maintain a plurality of group-based communication workspaces and all associated functionality, including through which client devices communicate and interact in a group-based setting. Group-based communication system users are organized into organization groups (e.g., in certain embodiments, employees of different companies are separate organization groups) and each organization group interacts with the system via at least one group-based communication workspace. For example, the group-based communication system might support, among others, a plurality of workspaces associated with Slack Corporation and a plurality of workspaces associated with ACME Corporation. Example group-based communication systems comprise supporting servers and client devices, and are further configured to engage with external resources and external applications.

Group-based communication system users are organized into organization groups (e.g., in certain embodiments, employees of each company are a separate organization group) and each organization group or sub-group has one or more group-based communication workspaces and/or group-based communication channels to which users are assigned or which the users join (e.g., group-based communication channels can represent departments, geographic locations such as offices, product lines, user interests, topics, issues, and/or the like). In some embodiments, a group identifier is used to facilitate access control for a message (e.g., access to the message, such as having the message return as part of search results in response to a search query, is restricted to those users having the group identifier associated with their user profile). In some embodiments, the group identifier is used to determine context for the message (e.g., in certain embodiments, a description of the group, such as the name of the group and/or a brief description of the group, is associated with the group identifier).

A user may access the group-based communication system via a client device to enable access to one or more group-based communication interfaces including various information and/or data linked to group-based communication workspaces and/or group-based communication channels associated with an authenticated user account. Each user account may be provisioned to access one or more group-based communication workspaces and/or associated group-based communication channels. Group-based communication system users may join and/or create group-based communication channels. Some group-based communication channels may be globally accessible to those users having a particular organizational identifier associated with their user profile (i.e., users who are members of the organization). Access to some group-based communication channels is restricted to members of specified workspaces, whereby the group-based communication channels are accessible to those users having a particular group identifier associated with their user profile. In some embodiments, the group-based communication channel identifier is used to facilitate access control for a message (e.g., access to the message, such as having the message return as part of search results in response to a search query, is restricted to those users having the group-based communication channel identifier associated with their user profile, or who have the ability to join the group-based communication channel). In certain embodiments, the group-based communication channel identifier is used to determine context for the message (e.g., a description of the group-based communication channel, such as a description of a project discussed in the group-based communication channel, is associated with the group-based communication channel identifier).

The term "group-based communication platform" refers to a computing platform embodied for the purpose of supporting a group-based communication system, as a collection of computing services that are accessible to one or more client devices, and that are operable to provide access to a plurality of software applications related to operations of databases. In some examples, the group-based communication platform takes the form of one or more central servers disposed in communication with one or more additional servers running software applications and having access to one or more databases storing digital content items, application-related data, and/or the like.

The term "group-based communication server" refers to a software platform and associated hardware that is configured to manage access to the various group-based communication interfaces of the group-based communication system. The group-based communication server is configured to access, maintain, and support application product logic of the group-based communication system and to access one or more data repositories such as a group-based communication repository. The group-based communication server is configured for interacting with various client devices for receiving and/or disseminating messages for distribution within communication channels. Group-based communication servers may be configured to receive, store (in an associated database), and/or direct messages exchanged between users (operating via client devices). The functionality of the group-based communication servers may be provided via a single server or collection of servers having a common functionality, or the functionality of the group-based communication servers may be segmented among a plurality of servers or collections of servers performing subsets of the described functionality of the group-based communication servers. For example, a first subset of group-based communication servers may be configured for receiving messages from client devices and/or for transmitting messages to client devices (e.g., via one or more interface servers). These group-based communication servers may be in communication with a second subset of group-based communication servers configured for collecting messages distributed within communication channels and for storing those messages within a message repository database for indexing and archiving.

The term "group-based communication interface" is a graphical user interface of a group-based communication system that is configured to allow users to (e.g., group members) to view and engage a group-based communication workspace. A group-based communication interface is rendered to a client device based on data and instructions provided by the group-based communication system. In some embodiments, such data and instructions are facilitated by a dedicated software application running on the client device. In other embodiments, such data and instructions are provided through a web browser running on the client device.

The term "group-based communication workspace" refers to a virtual communications environment configured to facilitate user interaction with a group-based communication system, the virtual communications environment having restricted access such that it is not generally accessible and/or searchable by other members of the group-based communication system. Each group-based communication workspace is accessible and viewable to a select group of users, such as a group of employees of a business or organization (e.g., the Slack Corp. workspace would be accessible and viewable to the Slack employees however the ACME Corporation group-based communication workspace would not be accessible and viewable to Slack employees). In certain embodiments, the group-based communication workspace includes and provides access to a plurality of group-based communication channels (e.g., a marketing channel, a sales channel, an accounting channel, etc.), which are defined herein.

The terms "group-based communication application" or "group-based communication app" refer to a dedicated software program, application, platform, service, web browser, or computer-executable application software programmed or configured to run on a client device which provides the user access to the group-based communication system. Such a group-based communication application is typically designed to execute on mobile devices, such as tablets or smartphones. For example, in certain embodiments, an app is provided that executes on mobile device operating systems such as iOS©, Android©, or Windows©. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

The terms "group-based communication message," "messaging communication," and "message" refer to any electronically generated digital content object provided by a user that has security sufficient such that it is accessible only to a defined group of users and that is configured for display within a group-based communication channel. Messaging communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a timestamp associated with the post of the message, a group-based communication channel identifier. Each message sent or posted to a group-based communication thread further includes a group-based communication thread identifier. Each of the foregoing identifiers may comprise ASCII text, a pointer, a memory address, and the like.

The term "group-based communication channel" refers to a virtual communications environment or feed that is configured to display messaging communications posted by channel members (e.g., validated users accessing the environment using client devices) that are viewable only to the members of the channel. In certain embodiments, the format of the group-based communication channel appears differently to different members of the group-based communication channel; however, the content of the group-based communication channel (i.e., messaging communications) will be displayed to each member of the group-based communication channel. For instance, in one embodiment, a common set of group-based messaging communications will be displayed to each member of the respective group-based communication channel such that the content of the group-based communication channel (i.e., messaging communications) will not vary per member of the group-based communication channel. However, in another embodiment, a member may join a group-based communication channel and only be able to view subsequent group-based messaging communications (as opposed to historical group-based messaging communications posted prior to the user joining the channel). The group-based communication channels are generally topic-oriented, long-lasting channels as opposed to ad hoc ephemeral conversations in conventional messaging apps. Group-based communication channels are typically organized or arranged (e.g., alphabetically) in list form within a sidebar pane of the group-based communication interface based on the channel titles or names. The interface through which a member views a group-based communication channel is a "group-based communication channel interface".

The terms "group-based communication channel identifier" or "channel identifier" refer to one or more items of data by which a group-based communication channel is uniquely identified in a group-based communication system. For example, in some embodiments, a group-based communication channel identifier comprises ASCII text, a pointer, a memory address, and/or other unique identifier.

The term "group-based communication thread" or "thread" is a collection of message communications displayed in a subsidiary feed arising from or otherwise associated with a selected group-based messaging communication displayed in a selected group-based communication channel. A group-based communication thread may include one or more "threaded messages" or "thread communication messages" that are linked together in the subsidiary feed, wherein each is associated with the selected group-based messaging communication or "parent message."

The term "private group-based communication channel" refers to a group-based communication channel with restricted access settings such that it is not generally accessible and/or searchable by other members of the group-based communication system (i.e., members associated with other group-based communication workspaces). For example, only those users or administrators who have knowledge of and permission to access (e.g., a group-based communication channel identifier for the private group-based communication channel is associated with their user profile after the user has been validated/authenticated) the private group-based communication channel can view content of the private group-based communication channel.

The term "group-based communication object" refers to electronic data objects or digital content objects specifically executable and/or otherwise accessible via the group-based communication system and/or at least one external resource. Group-based communication objects may be received at the group-based communication system by receiving those group-based communication objects conveyed to (pushed to) the group-based communication system, or the group-based communication system may retrieve (pull to) various group-based communication objects stored within accessible storage areas of one or more client devices, external resources, and/or the like. The group-based communication objects include body content data and metadata. The body content data of the group-based communication objects may be interpreted by the group-based communication apparatus to display or otherwise convey human-readable representations of information and/or computer-executable content that causes a particular client device to operate in a particular way. Specifics of certain group-based communication objects examples are discussed herein, however, it should be understood that in certain embodiments, group-based communication objects may be embodied as messaging communications, draft messaging communications, emails, events, audio files, video files, document files, spreadsheet files, presentation files, tasks, and/or the like; as well as any contextual data corresponding therewith. Group-based communication objects may thus be non-personal (alternatively referred to as public) as they are exchanged between a plurality of users or otherwise made available to a plurality of users. Alternatively, group-based communication objects may be personal in nature (e.g., as defined by a portion of metadata associated with the group-based communication object), such that access to the content of the group-based communication object is limited to a single user (or a limited number of defined users). For example, group-based communication objects personal to a single user may encompass tasks or task lists defined personally by and for a particular user. Access to personal group-based communication objects may be limited to access requests associated with defined user identifiers. In certain embodiments, personal group-based communication objects may be represented as encrypted data when indexed in database storage areas and/or when included within work graph data structures including personal and non-personal group-based communication objects.

The term "group-based communication repository" refers to a computing location, such as a memory device, where data is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. The group-based communication repository may be a dedicated device and/or a part of a larger repository. Further, in some embodiments, the group-based communication repository may be embodied as a distributed repository such that some of the stored data is stored centrally in a location within the group-based communication system and other data stored in a single remote location or a plurality of remote locations. Alternatively, in some embodiments, the group-based communication repository is distributed over a plurality of remote storage locations only. In some embodiments, the group-based communication repository is encrypted in order to limit unauthorized access of such data. An example of a group-based communication repository is the "group-based communication workflow repository." In some embodiments, the group-based communication workflow repository stores data that is generated based on user input, user selections, and user interaction with the group-based communication system in association with an operational sequence set. Such data can be queried and retrieved by the group-based communication apparatus.

The term "group-based communication system data corpus" refers to a collection of group-based communication data objects that are capable of being transmitted, received, and/or stored in a group-based communication system. For example, a group-based communication system data corpus includes, but is not limited to, group-based communication data objects that have been received by a group-based communication system through group-based communication interfaces. In some embodiments, a group-based communication system data comprise one or more of a group-based communication data objects, group-based communication messages, group-based communication channels, and user profiles associated with the group-based communication system. One type of group-based communication system data corpus is the "group-based communication workflow data corpus" which refers to a collection of group-based communication data objects associated with operational sequence sets that are capable of being transmitted, received, and/or stored in a group-based communication platform.

As used herein, the terms "data," "content," "digital content," "digital content object," "information," and similar terms are used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, repeaters, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, repeaters, and/or the like.

The term "user" should be understood to refer to an individual, group of individuals, business, organization, and the like. Users referred to herein are discussed largely in connection with client device enabled activity for accessing a group-based communication interface (or set of group-based communication interfaces) of a group-based communication system. That is, in some embodiments, users access a group-based communication messaging system using client devices. Each user of the group-based communication system is associated with at least one "group identifier".

The terms "user profile," "user account," "user profile data," and "user account details" refer to data, files, and other information of a group-based communication system that is associated with a user, including, for example, a user identifier, one or more group-based communication channel identifiers associated with group-based communication channels to which the user has been granted access, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a time zone, a status, and the like. The user account details can include a subset designation of user credentials, such as, for example, login information for the user including the user's username and password.

The term "client device" refers to computer hardware and/or software that is configured to access a service made available by a server. The server is often (but not always) on another computer system, in which case the client device accesses the service by way of a network. Client devices include, without limitation, smart phones, tablet computers, laptop computers, wearables, personal computers, enterprise computers, and the like. In some embodiments, client devices are associated with a user. In certain embodiments, the association is created by the client device transmitting registration information for the user to the group-based communication server. In some instances, a client device is temporarily associated with a user (e.g., only when a user is logged onto the group-based communication system app).

The term "user engagement" refers to user interaction, via a graphical user interface, with the group-based communication interface or components thereof. Such user engagement with the group-based communication interface or components thereof can be via a multitude of interactions, such as, but not limited to, "non-keystroke engagement" or "keystroke engagement." Non-keystroke engagement refers to user interaction in which such user interaction is free from (i.e., excludes) the entering of one or more (e.g., keystroke) characters into a group-based communication interface. For example, touch-screen or mouse click engagement are examples of non-keystroke engagement. The term "keystroke engagement" refers to entering of one or more keystrokes into a component of the group-based communication interface. For example, input of one or more characters (e.g., alphanumeric characters or emojis) into a component of the group-based communication interface is one example of keystroke engagement.

The term "user identifier" refers to one or more items of data by which a user, a user profile, or the user's corresponding user account is uniquely identified within a group-based communication system. For example, a user identifier comprises American Standard Code for Information Interchange (ASCII) text, a pointer, a memory address, or other unique identifier.

The terms "group identifier," "workspace identifier," and "team identifier" refer to one or more items of data by which a group-based communication workspace within a group-based communication system is uniquely identified. For example, a group identifier comprises ASCII text, a pointer, a memory address, or other unique identifier. Group identifiers are used to distinguish group-based communication channels, messages, files, members, etc., associated with one group-based communication workspace from another group-based communication workspace.

The term "organization identifier" refers to one or more items of data by which an organization or users associated with an organization within a group-based communication system is uniquely identified. For example, in some embodiments, an organization identifier comprises ASCII text, a pointer, a memory address, and/or other unique identifier. In some embodiments, the organization identifier is associated with a select group of users, such as a group of employees of a business, enterprise, corporation, or organization (e.g., the organization identifier associated with Slack Corp. employees would be different than the organization identifier associated with ACME Corporation). The group-based communication workspaces and channels associated with Slack Corp.'s organization identifier would not be accessible or viewable by users associated with the ACME Corporation organization identifier. In certain embodiments, the organization identifier is associated with a plurality of group-based communication workspaces (e.g., a marketing group, a sales group, a patent group, etc.), which are defined herein.

A "sending user identifier" is associated with a collection of messages that are sent by a particular user (e.g., sent by a client device associated with the particular user, client identifier, user identifier, or user profile). In some embodiments, these messages are analyzed or parsed to determine context regarding the user (e.g., the user's expertise or interest in a topic is determined based on the frequency of mention of the topic or key words associated with the topic within such messages). A sending user identifier comprises ASCII text, a pointer, a memory address, or other unique identifier.

The term "workflow identifier" refers to one or more items of data by which an operational sequence set can be uniquely identified. For example, a workflow identifier can comprise ASCII text, a pointer, a memory address, and/or other unique identifiers.

The term "operational sequence set" refers to a sequence or series of operations, steps, requirements, routines, or processes organized to complete or achieve a certain purpose. Such operations, steps, requirements, routines, or processes, also known as operational sequence steps, are performed by various components within the group-based communication system and/or by various external applications. In some embodiments, some steps require user input or user engagement while other steps are automatically performed without interaction with the user via the client device. In certain embodiments, operational sequence sets are associated with a particular group-based communication channel or type of group-based communication channel. In still further embodiments, the operational sequence set is associated with a group-defined workflow template, defined below. Operational sequence sets are stored in a group-based communication repository, specifically a group-based communication workflow repository, from which such operational sequence sets are capable of being located and accessed by other components of the group-based communication system, such as a group-based communication apparatus.

The term "workflow interface object" refers to an object capable of being rendered in association with an operational sequence set to a group-based communication interface of a client device. For example, a workflow interface object may comprise an operational sequence set name and/or description of the functionality or purpose of the associated operational sequence set. A "channel supported workflow interface object" refers to such a workflow interface object that is associated with and configured for use with a specific group-based communication channel.

The term "interactive dialog interface" refers to a user interface element that is presented to a user as part of a group-based communication interface and is configured for interaction with the user through presentation of one or more dialogs and detection of user engagement. In some embodiments, the interactive dialog interface is configured to present any one or more of a plurality of dialogs, including but not limited to, a notification, a request for input, a confirmation, etc., that is intended to solicit feedback from the user. In some embodiments, the interactive dialog interface detects user engagement associated with the presented dialog, such as a selection of one or more of a plurality of available options, as freeform keystroke engagement, and/or the like. In certain embodiments, in response to detecting such user engagement, the interactive dialog interface comprises one or more additional dialogs or one or more elements for further user engagement. In some embodiments, the interactive dialog interface is presented as a pop-up or an overlaid display element displayed visually over another portion of the group-based communication interface. In still further embodiments, the interactive dialog interface is presented as a portion of the larger group-based communication interface.

The term "workflow trigger event" should be understood to refer to an event, occurrence, and/or incident that initiates a responsive action by the group-based communication apparatus upon detection. For example, upon detection of one type of workflow trigger events results in the retrieval of an operational sequence set by the group-based communication apparatus from a group-based communication repository. In some embodiments, a workflow trigger event is user-interaction-based. For example, the group-based communication apparatus detects the user's selection or indication. In other embodiments, a workflow trigger event is time-based. For example, the expiration of a timer serves as the workflow trigger event. In still further embodiments, a workflow trigger event originates from an external application.

The term "workflow milestone event" refers to a particular point within the operational sequence set used to measure the progress of the operational sequence set in comparison to the ultimate purpose or goal of the operational sequence set. In some embodiments, an operational sequence set comprises one workflow milestone event. In other embodiments, an operational sequence set comprises a plurality of workflow milestone events. In still further embodiments, an operational sequence set does not comprise any workflow milestone events. In some embodiments, a workflow milestone event is associated with a specified passage of time. In certain embodiments, a workflow milestone event is associated with the completion of a specified number of steps in the associated operational sequence set, the completion of certain task, a specific achievement or target in the operational sequence set, or the like.

The term "workflow event" refers to an electrically generated digital object transmitted in association with an operational sequence set. In some embodiments, the workflow event comprises instructions, directions, notifications, and/or the like that is associated with the operational sequence set. In some embodiments, a workflow event can be generated by various components of the group-based communication system. In still further embodiments, a workflow event can be generated by an external application. In still further embodiments, a workflow event can be generated in response to user input at a client device.

The term "workflow data" refers to a collection of data associated with an operational sequence set that is capable of being transmitted, received, and/or stored. In some embodiments, workflow data comprises data which defines the functionality of the operational sequence set associated therewith, the functionality of a particular operational sequential step in an operational sequence set, data associated with workflow events, data associated with workflow interface objects, data associated with workflow milestone events, and the like. In certain embodiments, workflow data is associated with a workflow identifier. Workflow data is generated by various components within the group-based communication system and/or by various external applications.

The term "workflow data input" refers to a collection of data associated with user engagement with an interactive dialog interface, the interactive dialog interface associated with an operational sequence set. In some embodiments, such workflow data input is stored to a group-based communication workflow data corpus.

The term "workflow menu interface" refers to a user interface element configured to be rendered to a group-based communication interface, the user interface element comprising one or more workflow interface objects and each of the workflow interface objects is associated with an operational sequence set. In some embodiments, the workflow interface objects and the operational sequence sets are associated with a particular channel identifier such that they are capable of being implemented in that channel (i.e., channel supported workflow interface objects and channel supported operational sequence sets). In some embodiments, each workflow interface object rendered within the workflow menu interface comprises additional data associated with each operational sequence set, such as a workflow name and a brief description of the operational sequence set. In certain, each workflow interface object is configured for user engagement via the group-based communication interface. In still further embodiments, the group-based communication apparatus detects user engagement of a selected workflow interface object via the group-based communication apparatus and initiates a selected operational sequence set associated with the selected workflow interface object.

The term "group-defined template" should be understood to refer to a group-wide structure used to develop an operational sequence set within a particular group in a group-based communication system. As such, the group-defined template regulates the specific parameters, settings, limitations, and/or configurations associated with operational sequence sets in the particular group. In some embodiments, a group-defined template is predetermined based on input from an administrator. In certain embodiments, a group-defined template is programmatically determined based on relationships identified among group-based communication objects of a group-based communication workflow data corpus. In still further embodiments, such relationships are programmatically determined based on one or more trained machine learning models.

A "group-defined channel configuration template" refers to a particular type of group-defined template utilized in configuring various parameters, settings, limitations, and/or configurations associated with creating a group-based communication channel. For example, in certain embodiments, a group-defined channel configuration template defines the permitted and/or required configurations for channel title objects, channel interface arrangements, channel folder structures, channel member suggestion sets, channel-specific external applications configurations, channel-specific message formatting configurations, or some combination thereof. In still further embodiments, the group-defined channel configuration template defines other channel title requirements or permissions, including but not limited, to channel title formatting constraints and channel naming conventions such as permitted prefixes and suffixes, length restrictions, language limitations, and the like. Other settings and parameters that can be defined by a group-defined channel configuration template are contemplated by this disclosure as set forth herein.

The term "channel creation request" refers to an electrically generated digital object that indicates that a user has provided an input comprising a request to create a group-based communication channel. In some embodiments, a channel creation request is represented via a temporary code that notifies a recipient that a user has made the request. To provide further context, a channel creation request is generated in response to a user interaction with a group-based communication interface presented on a display screen of a client device. A user causes the client device to generate a channel creation request by interacting with, for example, a specific channel-creation actuator button that forms part of the group-based communication interface.

The term "channel title object" refers to an object defined by certain channel title parameters and is capable of being rendered to a group-based communication interface of a client. In some embodiments, the channel title object is a user interface element rendered to the group-based communication interface that is configured to enable a user to interact with the group-based communication system and select or enter a channel title for a group-based communication channel. In certain embodiments, the rendering of the channel title object allows for freeform entry. In other embodiments, the rendering of the channel title object requires selection by the user of a channel title suggestion. The channel title parameters, which define the channel title object, include channel title formatting constraints such as permitted prefixes and suffixes, length restrictions, language limitations, and the like. In some embodiments, the channel title parameters are group-defined.

The term "channel interface arrangement" refers to the format, layout, configuration, organization, or display of the individual user interface elements and components that are rendered to a group-based communication interface in association with a group-based communication channel interface. The "group-based communication channel interface" is a virtual communications environment or feed that is configured to display messaging communications posted by channel members that are viewable only to the members of the group.

In some embodiments, the specific configuration of a messaging pane and sidebar pane to be displayed in a first group-based communication channel interface differ from the configuration to be displayed in a second group-based communication channel interface. In still further embodiments, the channel interface arrangement includes other user interface elements and components such as tabs or other selectable elements allowing for additional and/or alternative information to be displayed to the user.

The term "channel folder structure" refers to the organization and placement of a group-based communication channel in a virtual folder, the structure and arrangement of the group-based communication channel and virtual folder reflecting the channel's relationship to other group-based communication channels. For example, a plurality of group-based communication channels related to a first common project can be organized and stored under a first virtual folder, while a plurality of group-based communication channels related to a second common project are organized and stored under a second virtual folder. In some embodiments, a representation of such virtual folder structure and channel titles associated with the organized group-based communication channels are rendered to the group-based communication interface, reflecting the relationship of the plurality of group-based communication channels.

The term "channel member suggestion set" refers to a set of suggested user recipients identified as potential members to be provided access to the particular group-based communication channel.

The term "channel invitation request" refers to a messaging communication generally directed to a user recipient inviting the selected user recipient to become a member of the group-based communication channel (e.g., a validated user accessing the environment using client devices). The invitation request allows access to the group-based communication channel and generally includes a user engageable link to access the respective group-based communication channel interface.

The term "channel-specific external applications configuration" refers to the options, settings, functionality, customizations, or features associated with external applications as configured in association with a specific group-based communication channel. For example, in certain embodiments, the specific configuration of an external application as associated with a first group-based communication channel differs from the configuration of the same external application as associated with a second group-based communication channel. In some embodiments, determination of, access to, and authentication of one or more external applications is managed or configured on a group or workspace level. In other embodiments, determination of, access to, and authentication of one or more external applications is managed or configured on an organizational level. Additionally or alternatively, in some embodiments, an operational sequence step includes configuring a channel-specific external application configuration.

The term "channel-specific message formatting configuration" refers to the attributes, options, capabilities, customizations, or features that are available to a member when drafting and/or posting messaging communications to a specific group-based communication channel. For example, although a user may be a member of multiple channels, the user has certain text formatting options, emojis, effects, templates, etc. available when drafting and/or posting messaging communications to a selected group-based communication channel that are not available when drafting and/or posting messaging communication to other group-based communication channels. In some embodiments, the determination of such attributes, options, capabilities, customizations, or features is managed or configured on a group or workspace level. Additionally or alternatively, in some embodiments, an operational sequence step includes configuring a channel-specific message formatting configuration.

The term "external resource" or "external application" refers to a software program, application, platform, or service that is configured to communicate with the group-based communication system for providing an external service (i.e., not native to the group-based communication system) to a client device via a group-based communication interface and/or via a group-based communication workspaces. The external application may service, manage, and/or perform various functions that are accessible to a user. The external application operates on a compiled code base or repository that is separate and distinct from that which supports the group-based communication system. In some embodiments, external applications communicate with the group-based communication system, and vice versa, through one or more application program interfaces (APIs). As various examples, an external application may be configured for executing a calendaring/scheduling app, a to-do list app, a service provider app, a code building app, a software testing app, a storage repository app, and/or the like. In some embodiments, an external application is configured to perform or execute an operational sequence step associated with an operational sequence set initialized in the group-based communication system.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase is included in the at least one embodiment of the present invention and may be included in more than one embodiment of the present invention (importantly, such phrases do not necessarily refer to the same embodiment).

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "set" refers to a collection of one or more items.

The term "plurality" refers to two or more items.

The term "or" is used herein in both the alternative and conjunctive sense, unless otherwise indicated.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 200 via a communications network 102 using client devices 101A-101N. The group-based communication system 200 may comprise a group-based communication apparatus 210 in communication with at least one group-based communication repository 207, such as the group-based communication suggestions repository. Users may further access features or services of one or more external resources 103A-103N through the group-based communication system 200.

Communications network 102 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 102 may include a cellular telephone, an 802.11, 802.16, 802.20, and/or WiMax network. Further, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedural call), JSON over REST ("Representational State Transfer")/HTTP ("HyperText Transfer Protocol"), and the like.

The group-based communication apparatus 210 may be embodied as a computer or computers. The group-based communication apparatus 210 may provide for receiving of electronic data from various sources, including but not necessarily limited to the client devices 101A-101N. For example, the group-based communication apparatus 210 may be operable to receive and post or transmit group-based messaging communications provided by the client devices 101A-101N.

The group-based communication repository 207 may be embodied as a data storage device(s) such as a Network Attached Storage (NAS) device or devices, or as a separate database server or servers. The group-based communication repository 207 includes information accessed and stored by the group-based communication apparatus 210 to facilitate the operations of the group-based communication system 200. For example, the group-based communication repository 207 may include, without limitation, a plurality of messaging communications organized among a plurality of group-based communication channels, a plurality of draft messaging communications, and/or the like. A specific example of a group-based communication repository 207 includes the group-based communication workflow repository as described herein. Such group-based communication suggestions repository may include, without limitation, user profile data, user role data, user organization data, user topic data, historical channel interaction data, historical thread interaction data, historical user interaction data, user recipient data, group-based communication thread data, and group-based communication channel data.

The client devices 101A-101N may be any computing device as defined above. Electronic data received by the group-based communication apparatus 210 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smartphone or tablet, the client device 101A-101N may execute an "app" to interact with the group-based communication system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally, or alternatively, the client device 101A-101N may interact with the group-based communication system 200 via a web browser. As yet another example, the client devices 101A-101N may include various hardware or firmware designed to interface with the group-based communication system 200.

Each of external resources 103A-103N represents an external system, resource, service, software application, computer, or the like, that a user of a client device associated with a corresponding group-based communication system user account may access via the group-based communication system 200. For example, the group-based communication system 200 may access an external resource via one or more application programming interfaces (APIs). An external resource may provide a specific service via a group-based communication interface of the group-based communication system 200. In one example, an external resource 103A may be a validated software source code repository, or the like, which members of a group-based communication workspace may collectively access as they collaborate to develop a new software application.

An external resource 103A-103N may be embodied in a variety of ways utilizing a variety of computing devices. For example, an external resource 103A-103N may be a computer or server remote from the group-based communication system 200 and accessible over the communications network 102 (e.g., over the Internet for example).

In some embodiments of an exemplary group-based communication system 200, a message or messaging communication may be sent from a client device 101A-101N to a group-based communication system 200. In various implementations, the message may be sent to the group-based communication system 200 over communications network 102 directly by a client device 101A-101N, the message may be sent to the group-based communication system 200 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like.

In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
```

```
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only one to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXXZ</client_serial number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details>//Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</teamidentifier>
        <channel_identifier>ID_channel_1</channel_identifier>
        <body contents>That is an interesting invention. I have attached a copy of our patent
```

```
policy.</body contents>
        <attachments>patent_policy.pdf</attachments>
    </message>
</auth_request>
```

The group-based communication system 200 comprises at least one group-based communication apparatus 210 that may create a storage message based upon the received message to facilitate message indexing and storage in a group-based communication repository 207. In one implementation, the storage message may include data such as a message identifier, a group identifier, a group-based communication channel identifier, a sending user identifier, topics, responses, message contents (i.e., body contents), attachments, message hierarchy data, third party metadata, conversation primitive data, and/or the like. For example, the group-based communication apparatus 210 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <body contents>That is an interesting disclosure. I have attached
a copy of our patent policy.</body contents>
    <attachments>patent_policy.pdf</attachments>
    <conversation_primitive>
        conversation includes messages: ID_message_8, ID_message_9,
        ID_message_10, ID_message_11, ID_message_12
    </conversation_primitive>
</storage_message>
```

In embodiments, a sending user identifier may be associated with the message communication. In one implementation, the message may be parsed (e.g., using PHP—i.e., the script language derived from Personal Home Page Tools—commands) to determine a sending user identifier of the user who sent the message.

In some embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In some embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, a group-based communication workspace, a group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like, messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the group-based communication channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 207). In one implementation, a storage message may be sent from group-based communication apparatus 210 to facilitate indexing in group-based communication repository 207. In another implementation, metadata associated with the message may be determined and the message may be indexed in group-based communication repository 207. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 207 to facilitate searching. In one embodiment, the files may be indexed such that a company's or a group's files are indexed at a separate distributed repository.

Example Apparatus for Implementing Embodiments of the Present Disclosure

The group-based communication apparatus may be embodied by one or more computing systems, such as group-based communication apparatus 210 shown in FIG. 2. The group-based communication apparatus 210 may include a processor 202, a memory 201, input/output circuitry 203, communications circuitry 205, group-based communication circuitry 204, and operational sequence circuitry 206. The apparatus 210 may be configured, using one or more of the circuitry 203, 204, 205, and 206 to execute the operations described herein.

Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 210 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or coprocessor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the group-based communication apparatus 210 to carry out various functions in accordance with example embodiments of the present disclosure.

The processor 202 may be embodied in a number of different ways and may, for example, include one or more processing devices configured to perform independently. Additionally, or alternatively, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 101A-101N (shown in FIG. 1) to enable message sharing therebetween. The processor 202 ensures that messages intended for exchange between the client devices 101A-101N within the particular communication channel are properly disseminated to those client devices 101A-101N for display within respective display windows provided via the client devices 101A-101N.

Moreover, the processor 202 may be configured to synchronize messages exchanged on a particular communication channel with a database for storage and/or indexing of messages therein. In certain embodiments, the processor 202 may provide stored and/or indexed messages for dissemination to client devices 101A-101N. The processor 202 may also provide to distribute such stored and/or indexed messages across various group-based communication workspaces and associated group-based communication channels as discussed herein.

In some embodiments, the group-based communication apparatus 210 may include input/output circuitry 203 that may, in turn, be in communication with processor 202 to provide output to the user and, in some embodiments, to receive an indication of a user input. The input/output circuitry 203 may comprise a user interface (e.g., a group-based communication interface) and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the group-based communication apparatus 210. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The group-based communication circuitry 204 comprises hardware and software configured to support a group-based communication system 200. The group-based communication circuitry 204 may utilize processing circuitry, such as the processor 202, to perform these actions. The group-based communication circuitry 204 may send and/or receive data from group-based communication repository 207. In some implementations, the sent and/or received data may be group-based communication objects (e.g., messages, files, links, etc.) organized among a plurality of group-based communication channels. It should also be appreciated that, in some embodiments, the group-based communication circuitry 204 may include a separate processor, specially configured field programmable gate array (FPGA), or application specific interface circuit (ASIC).

The operational sequence circuitry 206 comprises hardware and software configured to support operational sequence-related functionality, features, and/or services of the group-based communication system 200. The operational sequence circuitry 206 may utilize processing circuitry, such as the processor 202, to perform these actions. The operational sequence circuitry 206 may send and/or receive data from group-based communication repository 207 (e.g., the group-based communication workflow repository) and/or a group-based communication workflow data corpus. In some implementations, the sent and/or received data may be group-based communication objects, operational sequence set(s), operational sequence step(s), workflow identifier(s), workflow trigger event(s), workflow interface object(s), workflow event(s), workflow data and associated data. It should also be appreciated that, in some embodiments, the operational sequence circuitry 206 may include a separate processor, specially configured field programmable gate array (FPGA), or application specific interface circuit (ASIC).

It is also noted that all or some of the information discussed herein can be based on data that is received, generated and/or maintained by one or more components of the group-based communication apparatus 210. In some embodiments, one or more external systems (such as a remote cloud computing and/or data storage system, one or more external resources 103A-103N) may also be leveraged to provide at least some of the functionality discussed herein. In some embodiments, at least one workflow event is transmitted to one or more external applications. In certain embodiments, workflow data associated with at least one workflow event is received from one or more external applications. In still further embodiments, workflow trigger events and workflow events are generated by such one or more external applications.

As described above and as will be appreciated based on this disclosure, embodiments of the present disclosure may be configured as methods, mobile devices, frontend graphical user interfaces, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

In various embodiments of the present disclosure, the group-based communication apparatus 210 is configured to render one or more workflow interface objects in a group-based communication interface of a group-based communication system. In certain embodiments, the group-based communication apparatus 210 is configured to detect a workflow trigger event, which is an event, occurrence, and/or incident that initiates a specific responsive action by the group-based communication apparatus upon its detection. In certain embodiments, the detection of a workflow trigger event results in the retrieval of an operational sequence set by the group-based communication apparatus from a group-based communication repository. In some embodiments, the operational sequence set comprises a series of operational sequence steps.

In some embodiments, workflow trigger events are pre-defined. For example, a workflow trigger event can be a pre-defined association between a user engagement or interaction with the group-based communication interface (e.g., engagement with an executable element such as a button click or keystroke engagement including freeform entry, etc.) and the specific responsive action by the group-based communication apparatus. In still further embodiments, the workflow trigger event is learned by the group-based communication apparatus over time using machine learning models or other similar techniques.

A workflow trigger event can be any number of interactions or associations with the group-based communication system. As a non-limiting example, in some embodiments, an example user clicks on a channel creation button on the group-based communication interface or otherwise indicates her desire to create a group-based communication channel in the group-based communication system. In response, the client device generates and transmits a channel creation request to the group-based communication apparatus. In such an embodiment, the workflow trigger event is the channel creation request. In another non-limiting example, a channel topic appears in the channel header and it allows users to know what members in the channel are working on or important dates like project deadlines. In an instance where a channel topic is changed or revised, such modification can operate as a workflow trigger event. For example, the changing of the topic may imply that users coming to the channel need to know important information and the topic change operates as the workflow trigger event, triggering the group-based communication apparatus to retrieve an operational sequence related to the distribution of that important information.

In another non-limiting example, items (e.g., messages, reply messages, files, etc.) may be pinned to a details pane or otherwise associated with a pane in a group-based communication interface or group-based communication channel interface for easy reference to the user or to indicate a level of importance of the item. In some embodiments, the user's engagement or interaction with the group-based communication interface to pin or associate the item operates as a workflow trigger event, triggering the group-based communication apparatus to retrieve an operational sequence related to the distribution of that important information. In still another embodiment, the user's engagement or interaction with the group-based communication interface to set a channel reminder (e.g., a predefined reminder or a custom reminder) operates as a workflow trigger event, triggering the group-based communication apparatus to retrieve an operational sequence related to the execution of such reminder. In still further embodiments, the message contents posted in a channel may be parsed (e.g., using PHP commands) to determine or identify a workflow trigger event. For example, the group-based communication apparatus may parse the message contents, detect the entry of a phrase such as "what's in your schedule?" which in turn operates as a workflow trigger event, triggering the group-based communication apparatus to retrieve an operational sequence related to calendaring a meeting. For example, the operational sequence may include a series of operational sequence steps including installing and interacting with a third party calendar application or render an interactive dialog interface to various users in order to gather user input to suggest a meeting time.

As described herein, in various embodiments, the workflow trigger event is associated with a workflow identifier. In the above-described non-limiting example, the channel creation request (i.e., the workflow trigger event) is associated with a workflow identifier that uniquely identifies an operational sequence set for creating a group-based communication channel in that particular group (i.e., associated with a group identifier). In some embodiments, the identified operational sequence set comprises operational sequence steps that are sufficient to programmatically generate the group-based communication channel.

Upon detecting the workflow trigger event, the group-based communication apparatus retrieves an operational sequence set based upon at least the workflow identifier from a group-based communication workflow repository, initiates the retrieved operational sequence set, and causes rendering of one or more workflow interface objects to the group-based communication interface based upon the operational sequence set and the group-defined template. In a non-limiting example, the one or more workflow interface objects could be user interface components related to selecting and/or confirming channel configurations. For example, it is contemplated that the user would be presented with pre-defined placeholder channels with descriptions. In such an embodiment, the group-based communication apparatus renders one or more workflow interface objects depicting the available placeholder channels with associated descriptions.

Such pre-defined placeholder channels would be determined in a myriad of ways. For example, the most popular channel configurations associated with the individual user (i.e., the user identifier) would be provided as options to the user. In such an embodiment, the one or more workflow interface objects could be restricted to displaying only a specified number of popular channel configurations (e.g., top 3 most popular). The determination of which channel configurations to provide could be based on a number of variables, including most recent created by the user identifier, most frequent created by the user identifier, etc. In another non-limiting example, the pre-defined placeholder channels could be determined based on the channels to which the user identifier is identified as a member. This disclosure contemplates a variety of available operational sequence sets and associated workflow interface objects.

In another non-limiting example, the pre-defined placeholder channels could be determined based on the most popular channel configurations for a type of workspace as depicted in FIGS. 6A-6C. In the non-limiting embodiment depicted, a user is asked to identify a particular industry sector or type of workspace that is needed. Non-limiting examples include Film & Television, Game Development, Education, Non-Profit, Travel, Pharmaceutical, Finance, Construction, Government, Law Firm, etc. In the embodiment depicted, the user is associated with Acme Movie Company and the user selects Film & Television from an prompting interface object and the user clicks on the "Next" button 601 displayed or otherwise indicates here desire to create a group-based communication channel in the group-based communication system as depicted in FIG. 6A. In this non-limiting example, the selection or indication by the user of the Film & Television industry is a channel creation request (i.e., the workflow trigger event) for channels associated with Film & Television. Upon detecting the workflow trigger event, the group-based communication apparatus retrieves the operational sequence set based upon at least the workflow identifier from a group-based communication workflow repository, initiates the retrieved operational sequence set, and causes rendering of one or more workflow interface objects to the group-based communication interface based upon the operational sequence set and the group-defined template. In this non-limiting embodiment depicted in FIG. 6B, the one or more workflow interface objects are the various pre-defined placeholder channels 605 such as #scripts, #financing, #storyboards, #lighting, #casting, #extras, #catering, #hair-and-makeup, #locations, and #dailies. In the example embodiment depicted in FIG. 6B, the user selects #scripts.

In some embodiments, the retrieved operational sequence set is associated with a group-defined template. A group-defined template comprises a group-wide structure used to develop an operational sequence set within a particular group (e.g., associated with a group identifier) in a group-based communication system. For example, in some embodiments, the group-defined template comprises a group-defined channel configuration template. As such, the group-defined channel configuration template comprises the specific parameters, settings, limitations, and/or configurations associated with the operational sequence set for creating a group-based communication channel in that particular group. In certain embodiments, a group-defined channel configuration template defines the permitted and/or required configurations for channel title objects, channel interface arrangements, channel folder structures, channel member suggestion sets, channel-specific external applications configurations, channel-specific message formatting configurations, or some combination thereof. Although group-defined, in some embodiments, the operational sequence steps comprise configuring at least one such parameter.

In some embodiments, the channel title parameters and rendering of a channel title object to a group-based communication interface are group-defined. The channel title parameters, which define the channel title object, include channel title formatting constraints such as permitted prefixes and suffixes, length restrictions, language limitations, permitted characters, and the like. In a non-limiting example, a group-defined channel configuration template can restrict the length of a channel title or name to 20 characters, identify the use of available delimiters, and define the set of permitted prefixes that are available. However, other variations of restrictions, limitations, and settings for the channel title object are also contemplated by this disclosure as will be apparent to one of ordinary skill in the art.

In some embodiments, the arrangement of elements and components in a group-based communication channel interface are group-defined. In such embodiments, a group-defined channel configuration template can configure the channel interface arrangement. For example, the group-defined channel configuration template can determine the arrangement and dimensions of one or more panes displayed to the interface (such as the sidebar pane and the messaging pane). In some embodiments, the group-defined channel configuration template determines the organization of channel titles to be displayed in a sidebar pane (e.g., alphabetically vs. most recent used). In still further embodiments, the group-defined channel configuration can define the colors, shapes, outlines, and other features of the channel interface arrangement. In some embodiments, the group-defined channel configuration can define other user interface elements and components such as tabs or other selectable elements allowing for additional and/or alternative information to be displayed to the user as part of configuring the channel interface arrangement. For example, as discussed below, the rendering of a virtual folder structure representation can be used to reflect the relationship of a plurality of group-based communication channels. In some embodiments, the channel folder structure is configured with certain limitations and requirements, but the display and features of the resulting channel folder structure is configured according to the channel interface arrangement.

In some embodiments, the organization and placement of a group-based communication channel in a virtual folder that reflects the channel's relationship to other group-based communication channels are group-defined. For example, a plurality of group-based communication channels related to a first common project can be organized and stored under a first virtual folder, while a plurality of group-based communication channels related to a second common project are organized and stored under a second virtual folder. In some embodiments, the number of levels and sub-levels is defined by the group and can be configured according to an operational sequence set associated with a group-defined channel configuration template. In still further embodiments, an operational sequence set defines the routing of items into such virtual folders. For example, if a channel title begins with #proj_, it may be automatically routed or sorted to a specific virtual folder based on simply the channel prefix.

In other embodiments, the determination of potential channel members is group-defined. For example, as part of configuring a channel in association with an operational sequence set that is associated with a group-defined channel configuration template, the potential members can be identified as common users that are members of other similar channels in the group. In another embodiment, the potential members can be determined based on an analysis of the membership of the last five channels created by the user. In some embodiments, the channel member suggestion set can be rendered as one or more workflow interface objects to the group-based communication apparatus. The user can indicate approval of the set, and in some embodiments, edit or revise the channel member suggestion set. In certain embodiments, the channel member suggestion set comprises one or more user recipients to be sent a channel invitation request to become a member of the group-based communication channel. In other embodiments, the channel member suggestion set is not rendered to the group-based communication interface.

In further embodiments, upon configuration of the channel member suggestion set, the group-based communication apparatus is configured to programmatically generate a channel invitation request for each of the one or more user recipients and transmit the channel invitation requests to each of the one or more user recipients. In some embodiments, such features are completed by the group-based communication apparatus without user intervention or user engagement, automatically transmitting the channel invitation requests requiring approval or editing by the user.

In still further embodiments, the configuration of external applications is group-defined. For example, the availability of external applications can be defined per group in some instances. In still further embodiments, certain bundles of external applications can be determined based on the type of channel. For example, projects requiring the development of software code within a group will often utilize the same external applications to organize such development and allow for collaboration among the members. The group-defined channel configuration template can set or define the most popular bundles of external applications. In the non-limiting example embodiment depicted in FIG. 6C, after the user selected the #scripts channel in FIG. 6B, an array of buttons 610 associated with external applications that are associated with that type of channel and the group-defined channel configuration template are displayed to the user. In addition, in some embodiments, one of the operational sequence steps of the retrieved operational sequence set includes configuring the determination, arrangement, and authentication of certain external applications that are associated with the type of channel being created. For example, in certain embodiments, the specific configuration of an external application as associated with a first group-based communication channel differs from the configuration of the same external application as associated with a second group-based communication channel.

In still further embodiments, the configuration of formatting options, capabilities, customizations, and features associated with messages in a channel is group-defined. For example, the available options can be group-defined and the operational sequence set associated with configuring a channel for a specific group can comprise configuring the options to a specific channel or type of channel. For example, some channel types require certain text formatting options, emojis, effects, templates, etc. available to users when drafting and/or posting messaging communications to the selected group-based communication channel. In a non-limiting example, certain emojis or series of emojis can correspond to a group-defined template for emojis. For example, specific emojis may correspond to the completion of certain operational sequence steps associated with an operational sequence set. Said differently, a group-defined template for emojis can be associated with a tracking of progress.

Similarly, in still further embodiments, the configuration of messaging options such as predetermined or canned message responses may be group-defined. For example, based on the type of channel being configured, certain predetermined or canned message responses may be configured, such as predetermined message responses in a customer service channel or help/ticketing type channel (e.g. "Your help ticket has been received. You will receive a response within 24 hours.").

Although the above-described examples are generally described in connection with the configuration of a channel, one of ordinary skill in art would understand and it should be understood that the group-defined template (and as a result, the associated operational sequence set(s)) have a wide variety of applications, including, but not limited to, configuration of team, group, or organizational budgets, onboarding of new employees, onboarding of new matters or customer relationships, various project lifecycles, and the like. For example, in some embodiments, an operational sequence set corresponds to email interoperability. Said differently, the group-based communication system is configured to manage interactions with non-users or users utilizing electronic mail messages from third party systems such that the incoming electronic mail messages are parsed and directed into a specific channel as a channel message. In some embodiments, the detection of the electronic mail message is a workflow trigger event and the associated operational sequence set relates to handling such electronic mail message. For example, in a sales environment example, potential leads may be sent via electronic mail message. The contents of such electronic mail message may be parsed to determine the correct channel within which the electronic mail message should be converted and posted. The operational sequence set contains related operational sequence steps such as assigning the potential new lead in a round-robin fashion to certain users, sending an automated return message indicating a potential wait time, etc. In still another non-limiting example, a user's acceptance of a channel member invitation request or a workspace invitation request operates as a workflow trigger event. In such an embodiment, the associated operational sequence set contains related operational sequence steps such as the automatic configuration of certain third party applications, distribution of certain important resources, etc.

In still further embodiments, the operational sequence steps further comprise programmatically generating and transmitting at least one workflow event to one or more external applications. For example, as part of creating a channel or specific type of channel, access to one or more external applications may be required. In such embodiments, the at least one workflow event can be associated with the authentication of the external application, such as transmission of unique information required for authentication. In other embodiments, the at least one workflow event can be associated with the configuration of the external application to the particular channel. For example, an unaltered or "out of the box" external application may not work sufficiently for a user's needs. The at least one workflow event can be associated with the integration of such external application to the specific requirements of the user and the associated channel. In a non-limiting example, a channel associated with software development may require access to and use of a project management application, an issue/bug tracking application, an electronic mail message application, a calendar application, a spreadsheet application, and/or a task management application. The operational sequence steps associated with such channel include programmatically generating and transmitting workflow events associated with authentication and configuration of such applications. In still further embodiments, the at least one workflow event can be associated with providing an alert to the external application. In still further embodiments, the at least one workflow event can be associated with a request. For example, a user may enter data into the group-based communication system. The operational sequence steps and associated workflow events in such instance correspond to logging the data entered into the group-based communication system and mapping such data to the external application without affecting the user's experience with external application. In still further embodiments, the operational sequence steps further comprise receiving at least one workflow event from the one or more external applications. Said differently, in some embodiments, the series of operational sequence steps include closing the loop in relation to the request/information/data transmitted to the external application. For example, the external application returns requested data in order to update the group-based communication system with respect to the workflow trigger event. In a non-limiting example, the detection of certain message contents in a parsed message operates as a workflow trigger event. After retrieving and initiating an operational sequence set, the operational sequence steps further comprise programmatically generating and transmitting at least one workflow event an external application, such as an issue/bug tracking application. After addressing such issue/bug the external application transmits a workflow event indicating the completion and resolution of such issue/bug. In some embodiments, in response to detecting or receiving such workflow event from the external application, the group-based communication apparatus causes rendering of one or more workflow interface objects to the group-based communication interface based upon the operational sequence set and the group-defined template. For example, the detection or receipt of such workflow event from the external application can trigger rendering the original parsed message (e.g., workflow trigger event) as a parent message in a thread and posting a child thread message in response within such thread, the child thread message indicating the resolution of such issue/bug and otherwise closing the loop of such operational sequence set. Other workflow events and responses are contemplated by this disclosure. For example, the original message (e.g., workflow trigger event) can be updated or modified to indicate resolution or an associated emoji can be updated or modified to indicate resolution. Other variations of workflow events associated with external applications are also contemplated by this disclosure as will be apparent to one of ordinary skill in the art.

In still further embodiments, the operational sequence steps further comprise programmatically generating and transmitting at least one workflow event to one or more additional group-based communication channels. For example, as part of creating a channel or specific type of channel, a notification, request, or alert to another channel associated with a project may be required. In a non-limiting example, in creating a channel for a new project for the sales team, the operational sequence step can comprise programmatically generating and transmitting a notification to a group-based communication channel associated with management or the HR department to begin onboarding employees and staffing the matter. In such embodiments, the at least one workflow event can be associated with the authentication of the external application, such as transmission of unique information required for authentication. In other embodiments, the at least one workflow event can be associated with the configuration of the external application to the particular channel. In still further embodiments, the at least one workflow event can be associated with providing an alert to the external application. In still further embodiments, the at least one workflow event can be associated with a request. Other variations of workflow events associated with external applications are also contemplated by this disclosure as will be apparent to one of ordinary skill in the art.

In other embodiments, channel supported operational sequence sets are also available within a group-based communication channel. FIG. 3A depicts an example group-based communication interface 300 structured in accordance with various embodiments of the present disclosure. In some embodiments, the group-based communication interface 300 comprises a plurality of "panes" such that the group-based communication interface 300 is divided into two or more panes. In such embodiments, the group-based communication apparatus is configured to render a plurality of panes to the group-based communication interface 300. In such instances, the plurality of panes are configured to be viewable simultaneously within a defined window display of the group-based communication interface 300. For example, the depicted group-based communication interface in FIGS. 3A-3B is divided into two panes, a first pane and a second pane, which are viewable simultaneously within the defined window display of the group-based communication interface 300. Specifically, the depicted group-based communication interface 300 comprises a sidebar pane 305 and a message pane 310. In some embodiments, the conversation feed associated with the group-based communication channel is rendered to the first pane (i.e., the messaging pane 310) when the user is accessing the group-based communication system via a group-based communication channel interface.

The depicted group-based communication interface 300 further comprises an operational sequence interface element 320 rendered to the messaging pane 310 of the group-based communication interface 300. Such depiction, however, is for purposes of illustration and not of limitation and other suitable variations of the operational sequence interface element 320, including the representation of and location/placement of the operational sequence interface element 320 in the group-based communication interface 300, are also contemplated by this disclosure as will be apparent to one of ordinary skill in the art.

Once a user clicks on or otherwise engages the operational sequence interface element 320, the client device generates and transmits an operational sequence set query. Operational sequence set queries structured in accordance with various embodiments of the present disclosure include at least a channel identifier associated with the group-based communication channel associated with the request. It is contemplated that other embodiments of the operational sequence set queries comprise additional or alternative unique identifiers. For example, in one embodiment, the operational sequence set query comprises a group identifier. In still other embodiments, the operational sequence set query comprises a workflow identifier.

Upon receipt of the operational sequence set query associated with the channel identifier, the group-based communication apparatus is configured to query a group-based communication workflow repository for channel supported operational sequence sets associated with the channel identifier. In a non-limiting example, those operational sequence sets that are configured for, associated with, or otherwise supported in a specific group-based communication channel are stored in an array in association with the respective channel identifiers in such a repository FIG. 3B depicts the group-based communication interface 300 of FIG. 3A; however, in the depicted embodiment, the group-based communication interface 300 has been configured to include a workflow menu interface 330. In some embodiments, the group-based communication apparatus causes rendering of the workflow menu interface 330 to the group-based communication interface 300 of a client device associated with the operational sequence set query. In some embodiments, the workflow menu interface 330 comprises channel supported workflow interface objects 340, wherein each of the channel supported workflow interface objects is associated with one of the channel supported operational sequence sets. The depicted workflow menu interface 330 comprises three channel supported workflow interface objects 340 (e.g., monthly forecasting, quarterly planning, year-end budgeting) as shown. Each channel supported workflow interface object 340 is associated with one of the channel supported operational sequence sets returned by the query. For example, the 'Monthly Forecasting' channel supported workflow interface object 340 is associated with an operational sequence set that will facilitate a series of operational sequence steps related to monthly forecasting. Although the examples disclosed in FIG. 3B herein generally are described in connection with finance-related operational sequence sets, one of ordinary skill in art would understand and it should be understood that the disclosed operational sequence set(s) and operational sequence step(s) have a wide variety of applications, including, but not limited to, marketing, patents, legal, manufacturing, etc.

In some embodiments, each of the channel supported workflow interface objects 340 is configured for user engagement via the group-based communication interface 300. Configuring channel supported workflow interface objects for user engagement allows a user to click on, engage with, touch, or otherwise select a channel supported workflow interface object 340. In still further embodiments, the group-based communication apparatus is configured to detect user engagement of a selected channel supported workflow interface object 340 via the group-based communication interface 300 and initiate a selected channel supported operational sequence set associated with the selected channel supported workflow interface object 340, wherein the selected channel supported operational sequence set comprises operational sequence steps. For example, upon selection of the 'Monthly Forecasting" channel supported workflow interface object 340, the group-based communication apparatus is configured to initiate the associated 'Monthly Forecasting' channel supported operational sequence set, which comprises a operational sequence steps sufficient to configure monthly forecasting.

In some embodiments, at least one of the operational sequence steps comprises programmatically generating and transmitting at least one workflow event to one or more external applications. In the above described non-limiting example, the Monthly Forecasting operational sequence set can include an operational sequence step requiring interaction with a forecasting software application, such as a notification requesting initiating such monthly forecast. In still further embodiments, it is contemplated, that at least one of the operational sequence steps comprise programmatically generating and transmitting at least one workflow event to one or more additional group-based communication channels. For example, in the Monthly Forecasting example, pushing out notifications to other channels could be required to cull monthly forecasts from a variety of departments.

In other embodiments, the group-based communication apparatus is configured to receive workflow data associated with at least one workflow event from the one or more external applications and store the received workflow data to a group-based communication workflow data corpus. For example, in the non-limiting Monthly Forecasting example, the forecasting software application can return certain forecasting data to the group-based communication apparatus in response to the workflow event. Such data transmitted, received, and stored to the group-based communication workflow data corpus is not limited to the contents of the forecasting data, but also comprises associated metadata (e.g., timestamps, etc.).

In some embodiments, the operational sequence steps comprise causing one or more workflow interface objects to be rendered within the group-based communication interface of the client device. Such workflow interface objects are utilized to provide notifications, reminders, alerts, requirements, requests, etc. to the user (or other users, external applications, etc.) associated with the selected channel supported operational sequence set. In still further embodiments, the one or more workflow interface objects are configured to embody an interactive dialog interface for user engagement via the group-based communication interface 300. For example, the interactive dialog interface may comprise a modal pop-up requiring the user to click, select, or otherwise indicate that the user has completed a specified step or task, before the operational sequence set can continue. The embodiments described herein are not limited to pop-ups (e.g., overlaid displayed element displayed visually over another portion of the group-based communication interface 300) and non-keystroke engagement (e.g., clicking a button), but also contemplate the interactive dialog interface presented as a portion of or the entirety of the larger group-based communication interface and allowing freeform keystroke engagement with the interface.

In some embodiments, the interactive dialog interface is configured to present any one or more of a plurality of dialogs, including but not limited to, a notification, a request for input, a confirmation, etc., that is intended to solicit feedback from the user. In certain embodiments, in response to detecting such user engagement, the interactive dialog interface comprises one or more additional dialogs or one or more elements for further user engagement. In still further embodiments, the group-based communication apparatus is configured to store workflow data input associated with user engagement of the interactive dialog interface to the group-based communication workflow data corpus. Such stored workflow data input can be used in machine learning and identifying relationships as described below.

In some embodiments, the selected channel supported operational sequence set comprises at least one workflow milestone event and the interactive dialog interface is associated with the at least one workflow milestone event. A workflow milestone event is a particular point within the operational sequence set used to measure the progress of the operational sequence set in comparison to the ultimate purpose or goal of the operational sequence set. In some embodiments, an operational sequence set comprises one workflow milestone event. In other embodiments, an operational sequence set comprises a plurality of workflow milestone events. In still further embodiments, an operational sequence set does not comprise any workflow milestone events. In some embodiments, a workflow milestone event is associated with a specified passage of time. In certain embodiments, a workflow milestone event is associated with the completion of a specified number of steps in the associated operational sequence set, the completion of certain task, a specific achievement or target in the operational sequence set, or the like. For example, in the Monthly Forecasting example described above, a workflow milestone event may be associated with a certain percentage of departments completing monthly forecasts and the associated interactive dialog relates to notifying the user of the progress. In some embodiments, the workflow milestone event is detected by comparing workflow data to a predetermined or machine-learned threshold.

In still further embodiments, the operational sequence set is further associated with a group identifier and the group-based communication apparatus is configured to programmatically generate and transmit at least one workflow event to one or more client devices associated with the group identifier in response to detecting completion of a first workflow milestone event. For example, in the Monthly Forecasting example described above, the group-based communication apparatus may send a notification to those channels associated with departments that have not yet completed their monthly forecasts.

In certain embodiments, the operational sequence steps further comprise causing one or more workflow interface objects to be rendered to the one or more client devices associated with the group identifier. For example, the workflow event comprising a notification to departments that have not yet completed monthly forecasting can also include a workflow interface object to be rendered to the client devices, requiring responses from the associated users. In still further embodiments, the group-based communication apparatus is further configured to receive workflow data associated with the workflow interface objects from the one or more client devices associated with the group identifier and store the received workflow data to a group-based communication workflow data corpus. Such stored workflow data can be used in machine learning and identifying relationships as described below.

In some embodiments, each of the channel supported operational sequence sets associated with a channel is also associated with a group-defined template, the group-defined template programmatically determined based on relationships identified among group-based communication objects of a group-based communication workflow data corpus. Thus, it is contemplated that channel supported sequence sets can be created, modified, and determined to be supported by a channel based on relationships identified in the group-based communication workflow data corpus. In still further embodiments, such relationships are programmatically determined based on one or more trained machine learning models.

Example Operations

Having described the group-based communication apparatus and exemplary circuitry comprising embodiments of the present disclosure, it should be understood that the group-based communication apparatus 210 may proceed to implement operational sequence sets within a group-based communication system in a number of ways.

FIG. 4 is a flowchart broadly illustrating a series of operations or process blocks of process 400 that are executed or performed to render one or more workflow interface objects in a group-based communication system in accordance with one embodiment of the present disclosure. The operations illustrated in FIG. 4 may, for example, be performed with the assistance of, and/or under the control of group-based communication apparatus 210.

In the embodiment illustrated in FIG. 4, the depicted process begins at Block 402, which includes detecting a workflow trigger event, the workflow trigger event associated with a workflow identifier. For example, a group-based communication apparatus may include means, such as the processor 202, input/output circuitry 203, operational sequence circuitry 206, or the like, for detecting a workflow trigger event.

At Block 404, the depicted process 400 further includes retrieving an operational sequence set based upon at least the workflow identifier from a group-based communication workflow repository, the operational sequence set associated with a group-defined template. A group-based communication apparatus may include means, such as the processor 202, operational sequence circuitry 206, or the like, for retrieving the operational sequence set.

At Block 406, the depicted process further includes initiating the operational sequence set and at Block 408, rendering one or more workflow interface objects the group-based communication interface based upon the operational sequence set and the group-defined template. For example, a group-based communication apparatus may include means, such as the processor 202, input/output circuitry 203, operational sequence circuitry 206, or the like, for performing such initiating and rendering steps.

FIG. 5A is a flowchart broadly illustrating a series of operations or process blocks of process 500 that are executed or performed to render a workflow menu interface in a group-based communication system in accordance with one embodiment of the present disclosure. The operations illustrated in FIG. 5A may, for example, be performed with the assistance of, and/or under the control of group-based communication apparatus 210.

In the embodiment illustrated in FIG. 5A, the depicted process begins at Block 502, which includes receiving a workflow operational sequence set query associated with a channel identifier. For example, a group-based communication apparatus may include means, such as the processor 202, input/output circuitry 203, operational sequence circuitry 206, or the like, for receiving the workflow operational sequence set query from a client device.

At Block 504, the depicted process 500 further includes querying a group-based communication workflow repository for channel support operational sequence sets associated with the channel identifier. For example, a group-based communication apparatus may include means, such as the processor 202, operational sequence circuitry 206, or the like, for performing such a query.

At Block 506, the depicted process further includes rendering a workflow menu interface to a group-based communication interface of a client device associated with the operational sequence set query. For example, an exemplary workflow menu interface as depicted in FIG. 3B may be rendered to the group-based communication interface of a client device associated with the operational sequence set query. The workflow menu interface comprises channel supported workflow interface objects, wherein each of the channel supported workflow interface objects is associated with one of the channel supported operational sequence sets returned by the query performed at Block 504. For example, a group-based communication apparatus may include means, such as the processor 202, operational sequence circuitry 206, or the like, for rendering such a workflow menu interface with associated channel supported workflow interface objects.

In some embodiments, at Block 508, the depicted process further includes detecting user engagement of a selected channel supported workflow interface object. In such embodiments, each of the channel supported workflow interface objects is configured for user engagement via the group-based communication interface and the group-based communication apparatus can detect such user engagement. A group-based communication apparatus may include means, such as the processor 202, input/output circuitry 203, or the like, for detecting such user engagement.

In some embodiment, the process optionally includes initiating a selected channel supported operational sequence set associated with the selected channel supported workflow interface object at Block 510. As described above with respect to the Monthly Forecasting non-limiting example, upon detecting user engagement of the 'Monthly Forecasting' channel supported workflow interface object as depicted in FIG. 3B, the channel supported Monthly Forecasting operational sequence set would be initiated. A group-based communication apparatus may include means, such as the processor 202, operational sequence circuitry 206, or the like, for initiating such selected channel supported operational sequence set.

In still further embodiments, at Block 512, the depicted process further optionally includes programmatically generating and transmitting at least one workflow event to one or more external applications. At Block 514, the depicted process includes receiving workflow data associated with the at least one workflow event from the one or more external applications. At Block 516, the depicted process includes storing the received workflow data to a group-based communication workflow data corpus. A group-based communication apparatus may include means, such as the processor 202, operational sequence circuitry 206, or the like, for performing such steps.

FIG. 5B is a signal diagram of an example data flow represented by process 500. That is, FIG. 5B illustrates an example signal diagram illustrating data flow interactions between a group-based communication apparatus, a group-based communication repository (i.e., group-based communication workflow repository, including group-based communication workflow data corpus), one or more external applications, and one or more client devices when rendering a workflow menu interface and initiating a channel supported operational sequence set in accordance with one embodiment. Process 500 is described as being performed by a client device 101A, an external resource 103A, a group-based communication apparatus 210, and a group-based communication repository 207. These may be similar to those previously discussed with regards to FIG. 1.

Generating a Work Graph of Group-Based Communication Objects

Group-based communication objects may be stored in one or more database storage areas of the group-based communication repository 207 during applicable data indexing procedures. Moreover, such group-based communication objects may be stored as entries of a graphical database (or a relational database providing similar functionality for illustrating relationships between group-based communication objects, or any of a variety of other database storage structures for providing similar data storage configurations), providing data illustrative of generated relationships between various group-based communication objects. Those relationships between group-based communication objects may be generated based at least in part on data generated and appended to various group-based communication objects, such as workflow data and workflow data input.

The relationships between group-based communication objects define a work graph illustrating relationships among a plurality of group-based communication objects, which may be usable by one or more artificial intelligence-based search systems for identifying a plurality of inter-related group-based communication objects to configure a group-defined template or determine which operational sequence sets supported by a group-based communication channel should be presented in response to a channel supported operational sequence set query. In certain embodiments, group-based communication objects stored within a work graph are each characterized by their own access credentials/requirements. Accordingly, some group-based communication objects within the work graph may only be accessible to a select group of users (e.g., a single user), whereas other group-based communication objects within the same work graph may be accessible to a larger/different group of users (e.g., all users associated with a particular group-based communication workspace). Despite these differences in accessibility between various group-based communication objects within a common work graph, relationships established between various group-based communication objects may be usable to establish topics for various group-based communication objects, for establishing a particular user's expertise, to determine relatedness of group-based communication objects for search queries, and/or the like.

For each group-based communication object, the group-based communication repository 207, the group-based communication apparatus 210, or other components of the group-based communication system 200 may perform an analysis of the data and/or metadata generated by the group-based communication system 200 to determine other group-based communication objects deemed sufficiently relevant to illustrate a connection within the work graph. Workflow data, workflow data input, and workflow events and their associated relationships to the group-based communication objects discussed herein add a valuable signal to be leveraged by the group-based communication system to inform any work graph data structure that is assembled to represent or otherwise embody a group-based communication object corpus or group-based communication workflow data corpus.

Each group-based communication object of the group-based communication workflow data corpus comprises metadata and body content data. In various embodiments, the group-based communication apparatus is configured to determine each group-based communication object's relationship to other group-based communication objects based on the metadata, workflow data, and the operational sequence sets. The group-based communication apparatus is thus configured to assemble the group-based object corpus into a work graph data structure.

In certain embodiments, the group-based communication apparatus may identify shared topics within metadata of one group-based communication object relative to other group-based communication objects; identify common operational sequence set(s); identify common channel supported operational sequence sets(s); identify common operational sequence step(s); identify similar workflow identifier(s); identify common workflow trigger event(s); identify common workflow event(s); identify common channel member(s); identify common channel title object(s); identify common channel configuration(s); identify common channel interface arrangement(s); identify common channel folder structure(s); identify common external applications configuration, identify common message formatting configurations; identify common group-based communication object types; identify temporal relationships between generation/transmission of group-based communication objects; and/or the like.

The group-based communication apparatus may establish weighted relationship scores between each of the group-based communication objects of the group-based communication object corpus (i.e., group-based communication workflow data corpus). For example, stronger relationships (e.g., a higher number of shared characteristics), or certain types of relationships (e.g., as identified via a machine learning algorithm) may result in a higher relationship score between the analyzed group-based communication object and one or more other group-based communication objects. These relationship scores may be ranked (e.g., by direct comparison of relationship scores, by normalization of comparison scores on a shared scale (e.g., 0-1), and/or the like). In certain embodiments, those relationship scores satisfying a first degree score criteria (e.g., exceeding a score threshold) may be utilized to establish direct relationships between the analyzed group-based communication object and those other group-based communication objects having a sufficient relationship score. Those first degree scores may then be mapped within the work graph data structure (e.g., by establishing edges between data indicative of group-based communication objects within a graphical database, by providing data indicative of related group-based communication objects within data of a particular group-based communication object database entry within a relational database, and/or the like). The process may then be repeated for each user identifier and/or each channel identifier of a given group-based communication workspace or set of group-based communication workspaces.

It should be understood that, in accordance with certain embodiments, relationships between various group-based communication objects may be symmetrical (e.g., the degree of relatedness of a first object to a second object is identical to the degree of relatedness of the second object to the first object). However, it should be understood that in other embodiments, the relationships between various group-based communication objects may be asymmetrical (e.g., the degree of relatedness of a first object to a second object is not identical to the degree of relatedness of the second object to the first object).

Although work graph data structures assembled as described herein may illustrate relationships between various group-based communication objects, the work graph data structures may also be utilized to determine relationships between users, between users and group-based communication channels, between users and topics, between group-based communication channels and topics, between group-based communication channels, between topics, between users and group-based communication objects, between group-based communication channels and group-based communication objects, between topics and group-based communication objects, and/or the like. Thus, the work graph data structure may be configured to establish relationships between group-based communication objects, and those relationships may be further utilized to identify relationships between other aspects of data utilized with the group-based communication apparatus (such as data indicative of particular users, channels, workspaces, operational sequence sets, and/or the like).

The group-based communication system (e.g., via the group-based communication repository 207, via the group-based communication apparatus 210, and/or the like) utilizes the work graph data structure to generate a machine learning structure trained machine learning model (e.g., a neural network) that may be utilized for programmatically determining a group-defined template for operational sequence sets. For example, the group-based communication system may implement an unsupervised learning structure, a supervised learning structure, a reinforcement learning structure, a deep learning structure, and/or the like for utilizing relationships established via the work graph data structure to generate a group-defined template, such as a group-defined channel configuration template, for various group-based communication objects.

In certain embodiments, a global machine learning algorithm may be utilized for all group-based communication objects stored at or accessible via the group-based communication platform system. In such embodiments, access to particular group-based communication objects (e.g., via a search query utilizing the machine-learning algorithm) may be limited based at least in part on access privileges of the searching user (e.g., a user may only be able to access group-based communication objects associated with permitted group-based communication channels). In other embodiments, machine learning algorithms may be established independently for each of a plurality of groups, such that training of the machine learning algorithm is based on group-based communication objects exchanged within the particular group alone.

The machine learning algorithms may be generated and/or updated periodically, to reflect changes within the work graph data structure that result from the addition and/or aging of group-based communication objects within the work graph data structure. Moreover, the machine learning parameters (including those parameters indicative of the underlying neural network of the machine learning algorithm) may be stored within the group-based communication repository.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. One or more non-transitory computer-readable media that store computer-executable instructions that, when executed by a processor, perform a method of joining users to a group-based communication channel, the method comprising:
 identifying one or more topics associated with the group-based communication channel from a plurality of messages;
 identifying one or more suggested users who are associated with an expertise corresponding to the one or more topics based on a frequency of mention of the one or more topics by the one or more suggested users;
 generating a channel member suggestion set including one or more suggested users who are recommended to join the group-based communication channel;

prior to generating a channel invitation request to the one or more suggested users:
  receiving, from a member user of the group-based communication channel, an approval to invite the one or more suggested users to the group-based communication channel;
joining the one or more suggested users to the group-based communication channel based on one or more criteria; and
notifying the one or more suggested users of at least one message of the plurality of messages in which the one or more suggested users have an associated expertise.

2. The one or more non-transitory computer-readable media of claim 1, wherein the method further comprises:
prior to joining the one or more suggested users to the group-based communication channel:
  generating a channel invitation request to the one or more suggested users; and
  automatically transmitting the channel invitation request to the one or more suggested users.

3. The one or more non-transitory computer-readable media of claim 1, wherein the channel member suggestion set is generated based further on user profile data including user status data.

4. The one or more non-transitory computer-readable media of claim 1, wherein the method further comprises:
creating a new group-based communication channel, wherein the one or more suggested users comprise at least one organization user from a first organization associated with a workspace in which the new group-based communication channel is created or at least one non-organization user from a second organization not associated with the workspace.

5. The one or more non-transitory computer-readable media of claim 1, wherein the method further comprises:
parsing a plurality of suggested user messages from the one or more suggested users to determine the frequency of mentioning of the one or more topics by the one or more suggested users.

6. The one or more non-transitory computer-readable media of claim 1, wherein the method further comprises:
determining one or more channel configurations for the group-based communication channel based on a most frequent channel configuration used by a user identifier of a member user.

7. A method of joining users to a group-based communication channel, the method comprising:
identifying one or more topics associated with the group-based communication channel from a plurality of messages;
identifying one or more suggested users who are associated with an expertise corresponding to the one or more topics based on a frequency of mention of the one or more topics by the one or more suggested users;
generating a channel member suggestion set including one or more suggested users who are recommended to join the group-based communication channel;
prior to generating a channel invitation request to the one or more suggested users:
  receiving, from a member user of the group-based communication channel, an approval to invite the one or more suggested users to the group-based communication channel;
joining the one or more suggested users to the group-based communication channel based on one or more criteria; and
notifying the one or more suggested users of at least one message of the plurality of messages in which the one or more suggested users have an associated expertise.

8. The method of claim 7 further comprising:
prior to joining the one or more suggested users to the group-based communication channel:
  generating a channel invitation request to the one or more suggested users; and
  automatically transmitting the channel invitation request to the one or more suggested users.

9. The method of claim 7, wherein the channel member suggestion set is generated based further on user profile data including user status data.

10. The method of claim 7 further comprising:
creating a new group-based communication channel, wherein the one or more suggested users comprise at least one organization user from a first organization associated with a workspace in which the new group-based communication channel is created or at least one non-organization user from a second organization not associated with the workspace.

11. The method of claim 7, further comprising:
parsing a plurality of suggested user messages from the one or more suggested users to determine the frequency of mentioning of the one or more topics by the one or more suggested users.

12. The method of claim 7, further comprising:
determining one or more channel configurations for the group-based communication channel based on a most frequent channel configuration used by a user identifier of a member user.

13. A system comprising at least one processor and at least one non-transitory memory storing computer executable instructions that when executed by the at least one processor cause the system to carry out actions comprising:
identifying one or more topics associated with a group-based communication channel from a plurality of messages;
identifying one or more suggested users who are associated with an expertise corresponding to the one or more topics based on a frequency of mention of the one or more topics by the one or more suggested users;
generating a channel member suggestion set including one or more suggested users who are recommended to join the group-based communication channel;
prior to generating a channel invitation request to the one or more suggested users:
  receiving, from a member user of the group-based communication channel, an approval to invite the one or more suggested users to the group-based communication channel;
joining the one or more suggested users to the group-based communication channel based on one or more criteria; and
notifying the one or more suggested users of at least one message of the plurality of messages in which the one or more suggested users have an associated expertise.

14. The system of claim 13, wherein the actions further comprise:
prior to joining the one or more suggested users to the group-based communication channel:
  generating a channel invitation request to the one or more suggested users; and
  automatically transmitting the channel invitation request to the one or more suggested users.

15. The system of claim 13, wherein the channel member suggestion set is generated based further on user profile data including user status data.

16. The system of claim 13, wherein the actions further comprise:
creating a new group-based communication channel, wherein the one or more suggested users comprise at least one organization user from a first organization associated with a workspace in which the new group-based communication channel is created or at least one non-organization user from a second organization not associated with the workspace.

17. The system of claim 13, wherein the actions further comprise:
parsing a plurality of suggested user messages from the one or more suggested users to determine the frequency of mentioning of the one or more topics by the one or more suggested users.

* * * * *